(12) United States Patent
Wang et al.

(10) Patent No.: US 12,126,724 B2
(45) Date of Patent: Oct. 22, 2024

(54) PROVIDING AND USING A USER LOGIN PROTECTION SERVICE

(71) Applicant: AT&T Intellectual Property I, L.P., Atlanta, GA (US)

(72) Inventors: Wei Wang, Harrison, NJ (US); Lars Johnson, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 111 days.

(21) Appl. No.: 17/951,184

(22) Filed: Sep. 23, 2022

(65) Prior Publication Data
US 2024/0106652 A1    Mar. 28, 2024

(51) Int. Cl.
*H04L 9/32*      (2006.01)
(52) U.S. Cl.
CPC .......... *H04L 9/3226* (2013.01); *H04L 9/3247* (2013.01)
(58) Field of Classification Search
CPC ........ H04L 9/50; H04L 9/3247; H04L 9/3226
USPC ............................................................ 726/4
See application file for complete search history.

(56) References Cited

U.S. PATENT DOCUMENTS

| 2019/0013934 A1* | 1/2019 | Mercuri | ................. | G06F 21/602 |
| 2022/0021528 A1* | 1/2022 | Dawson, III | .......... | H04L 9/0894 |

* cited by examiner

*Primary Examiner* — Benjamin A Kaplan
(74) *Attorney, Agent, or Firm* — Hartman & Citrin LLC

(57) ABSTRACT

Providing and using a user login protection service can include detecting, during a login creation process, input that indicates that a computing device has opted-in for protection for a login being created. During the login creation process, the login can be stored at a first data storage location, the login including an address that identifies a location of a distributed ledger and a password, and a reset password at a second data storage location comprising a secure data storage device. In response to detecting an attempt to log in to the third party device to access the resource, a value associated with the distributed ledger can be obtained, the value indicating a status of a trigger condition associated with the login. If the value is zero, the attempt to log in can be allowed to proceed. If the value is one, the attempt to log in can be blocked.

20 Claims, 7 Drawing Sheets

PROVIDING AND USING A USER LOGIN PROTECTION SERVICE

BACKGROUND

Authentication for websites and other resources has become more commonplace over the past several years. With the storage of payment methods and personal information, websites and other resources may be targeted for theft. When a login or identity is stolen, it may be difficult to again obtain exclusive ownership over one's identity and/or to obtain exclusive access to various online resources.

Because many users recycle passwords across sites, the compromising of identity and/or logins may affect more than one site for a particular user. When a leak or hack occurs, a user may have difficulty remembering all of his or her logins and/or sites across which the same login has been used. Password management solutions may help address this issue, but the time required to address a leak or hack may exceed the time required for an unauthorized entity to access personal information and/or make changes to accounts to protect them from additional access by unauthorized entities.

SUMMARY

The present disclosure is directed to providing and using a user login protection service. A computing device can opt-in to use the functionality of the login protection service. The login protection service can create a distributed ledger or other file and/or data structure, which can be associated with the computing device. The login protection service can store the distributed ledger (or a component thereof such as the hash ledger, the passed ledger, or the like) at the server computer or at a data location accessible by the server computer. In some embodiments, the passed ledger can be stored at the computing device, in a distributed network, and/or at a third party device. A block created for (e.g., mined from) the distributed ledger can include an address of the distributed ledger or a component thereof and one or more smart contracts around various conditions, with the last bit of the block corresponding to a status of the smart contract (a zero if the condition is not met and a one if the condition is met). Because the smart contracts can be coded into the distributed ledger, it can be appreciated that the conditions cannot easily be changed and that a condition being met will result in an automatic update to the value of the status identifier. In various embodiments, the server computer can determine the address of the distributed ledger, where the address can identify a location at which the distributed ledger is stored, a location of the distributed ledger, and a block identifier which can be set to a value of zero or one, and/or an address or location of the block. The server computer can provide an address identifier to the computing device for use in creating logins, with the address optionally pointing directly to the block. It should be understood that this example is illustrative, and therefore should not be construed as being limiting in any way.

The computing device can connect to a third party device at some time to access or request access to a resource such as a web page, application, or the like. At this time, or at other times, the computing device can create a login associated with the resource. The login can include the address (identified by the address identifier) and a password, which can be created by the computing device. According to various embodiments of the concepts and technologies disclosed herein, the computing device can also be given the opportunity to opt-in to login protection, and if opted-in the computing device can be required to create a reset password as part of the login creation process. The third party device can store the login (including the address and the password) at a first data storage location (e.g., the data repository) and the reset password at a second data storage location (e.g., the secure data repository).

The third party device can be configured to validate any attempt by the computing device to access the resource. According to various embodiments, the third party device can be configured to block or deny access to the resource if the credentials provided by the computing device do not match the login, while correct credentials may result in additional validation. It should be understood that this example is illustrative, and therefore should not be construed as being limiting in any way. To perform the additional validation, the third party device can be configured (e.g., via execution of the login protection module) to generate a query and to send the query to the server computer. The query can request a value for the block identifier associated with the distributed ledger that is identified by the address. It should be understood that this example is illustrative, and therefore should not be construed as being limiting in any way.

The server computer, e.g., via execution of the login protection service, can return the identified value to the third party device. In some embodiments, the value of the block identifier can be set to zero by default, and changed to a value of one if a lock trigger is identified by the login protection service (e.g., if a condition set by the smart contracts changes from false to true, or the like). Thus, the login protection module can be configured to deny access to the resource by the computing device if the value is one, even if correct credentials (that match the login) are provided by the computing device. If the value is equal to one, and therefore the login protection module determines that the login associated with the computing device is to be protected or locked, the third party device can modify the login to replace the password with the reset password associated with the computing device, and can send an alert to the computing device indicating that the password has been updated to the reset password.

The computing device can use the address and the reset password to log in to access the resource, though in various embodiments of the concepts and technologies disclosed herein the login protection module or other entities can require the computing device to create a new password for the login and/or a new reset password. Upon creating a new password and a new reset password, the computing device and/or the third party device can be configured to inform the server computer, and the block identifier associated with the distributed ledger can be set back to zero, in some embodiments (e.g., by the login protection service updating the trigger condition to reset the condition to reflect that the login is no longer compromised). It should be understood that this example is illustrative, and therefore should not be construed as being limiting in any way.

According to one aspect of the concepts and technologies disclosed herein, a system is disclosed. The system can include a processor and a memory. The memory can store computer-executable instructions that, when executed by the processor, cause the processor to perform operations. The operations can include detecting, during a login creation process, input that indicates that a computing device has opted-in for protection for a login being created; and storing, during the login creation process, the login in a first data storage location and a reset password in a second data storage location that can include a secure data storage device. The login can include an address and a password, where the address can identify a location of a distributed ledger associated with the computing device. The reset password can be associated with the login. The operations further can include in response to detecting an attempt by the computing device to log in to access a resource, obtaining a value associated with the distributed ledger, the value being associated with a trigger condition associated with the login. If a determination is made that the value is zero, the attempt to log in can be allowed to proceed. If a determination is made that the value is one, the attempt to log in can be blocked, the password of the login can be modified to be the reset password, and the computing device can be informed that the password has changed to the reset password.

In some embodiments, the trigger condition can include a smart contract associated with the distributed ledger, and the value can include a result of the smart contract. In some embodiments, the value can be zero if the result of the smart contract is false. In some embodiments, the value can be one if the result of the smart contract is true. In some embodiments, the address can identify a memory location at which the distributed ledger is stored. The distributed ledger can include a block generated for the computing device and can include a smart contract that can define the trigger condition for the protection for the login. In some embodiments, the login can be obtained from the computing device via a first communication channel and the value can be obtained via a second communication channel. In some embodiments, obtaining the value can include generating a query on the address, sending the query to a login protection service via a second communication channel, and receiving the query from the login protection service via the second communication channel.

According to another aspect of the concepts and technologies disclosed herein, a method is disclosed. The method can include detecting, by a computer including a processor and during a login creation process, input that indicates that a computing device has opted-in for protection for a login being created; and storing, by the processor and during the login creation process, the login in a first data storage location and a reset password in a second data storage location that can include a secure data storage device. The login can include an address and a password, where the address can identify a location of a distributed ledger associated with the computing device. The reset password can be associated with the login. The method further can include in response to detecting an attempt by the computing device to log in to access a resource, obtaining, by the processor, a value associated with the distributed ledger, the value being associated with a trigger condition associated with the login. If a determination is made that the value is zero, the attempt to log in can be allowed to proceed. If a determination is made that the value is one, the attempt to log in can be blocked, the password of the login can be modified to be the reset password, and the computing device can be informed that the password has changed to the reset password.

In some embodiments, the trigger condition can include a smart contract associated with the distributed ledger, and the value can include a result of the smart contract. In some embodiments, the value can be zero if the result of the smart contract is false. In some embodiments, the value can be one if the result of the smart contract is true. In some embodiments, the address can identify a memory location at which the distributed ledger is stored. The distributed ledger can include a block generated for the computing device and can include a smart contract that can define the trigger condition for the protection for the login. In some embodiments, the login can be obtained from the computing device via a first communication channel and the value can be obtained via a second communication channel. In some embodiments, obtaining the value can include generating a query on the address, sending the query to a login protection service via a second communication channel, and receiving the query from the login protection service via the second communication channel.

According to yet another aspect of the concepts and technologies disclosed herein, a computer storage medium is disclosed. The computer storage medium can store computer-executable instructions that, when executed by a processor, cause the processor to perform operations. The operations can include detecting, during a login creation process, input that indicates that a computing device has opted-in for protection for a login being created; and storing, during the login creation process, the login in a first data storage location and a reset password in a second data storage location that can include a secure data storage device. The login can include an address and a password, where the address can identify a location of a distributed ledger associated with the computing device. The reset password can be associated with the login. The operations further can include in response to detecting an attempt by the computing device to log in to access a resource, obtaining a value associated with the distributed ledger, the value being associated with a trigger condition associated with the login. If a determination is made that the value is zero, the attempt to log in can be allowed to proceed. If a determination is made that the value is one, the attempt to log in can be blocked, the password of the login can be modified to be the reset password, and the computing device can be informed that the password has changed to the reset password.

In some embodiments, the trigger condition can include a smart contract associated with the distributed ledger, and the value can include a result of the smart contract. In some embodiments, the value can be zero if the result of the smart contract is false. In some embodiments, the value can be one if the result of the smart contract is true. In some embodiments, the address can identify a memory location at which the distributed ledger is stored. The distributed ledger can include a block generated for the computing device and can include a smart contract that can define the trigger condition for the protection for the login. In some embodiments, the login can be obtained from the computing device via a first communication channel and the value can be obtained via a second communication channel. In some embodiments, obtaining the value can include generating a query on the address, sending the query to a login protection service via a second communication channel, and receiving the query from the login protection service via the second communication channel.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

Figure 1:
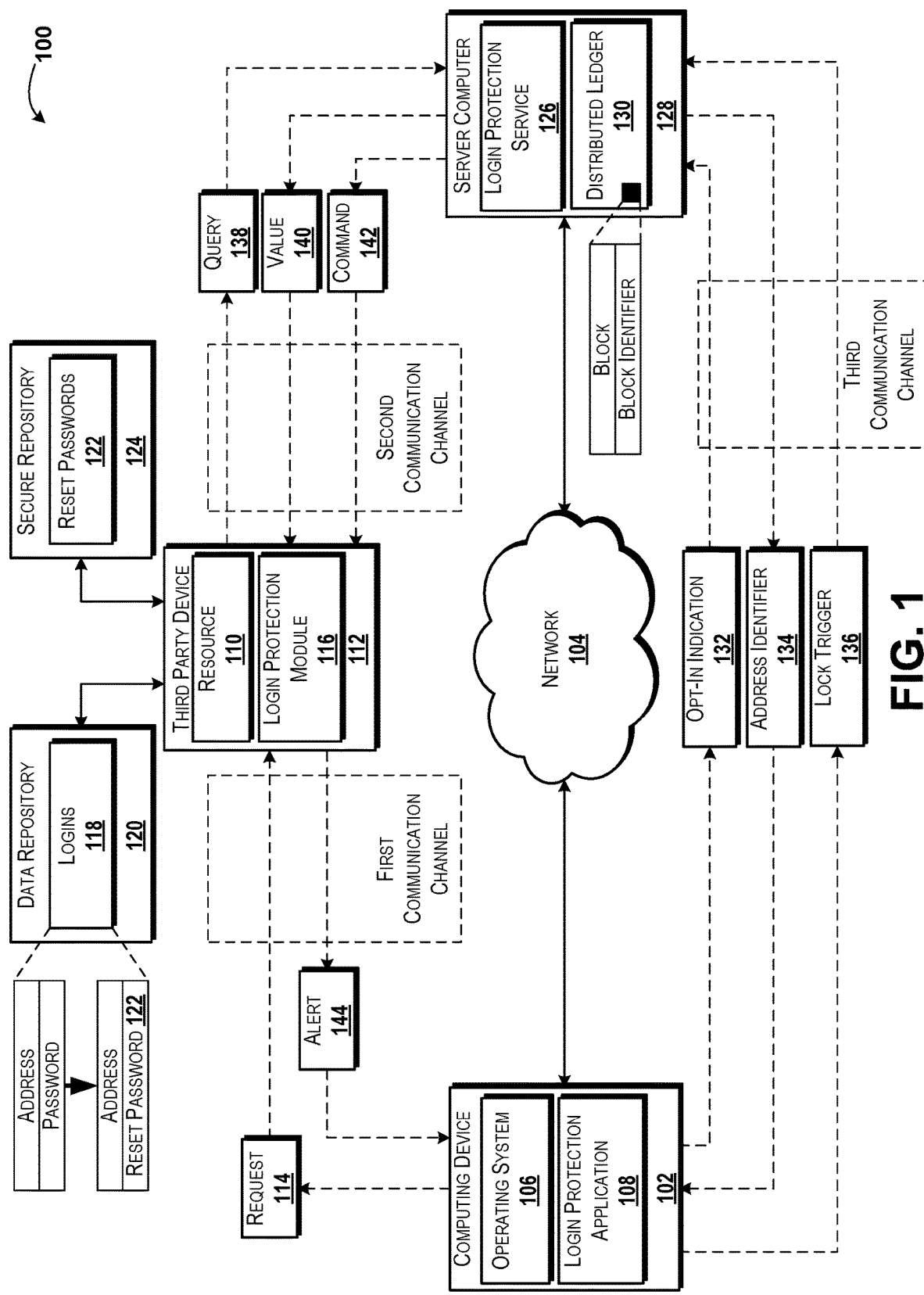
FIG. 1 is a system diagram illustrating an illustrative operating environment for various embodiments of the concepts and technologies described herein.

The following detailed description is directed to providing and using a user login protection service. A computing device can opt-in to use the functionality of the login protection service. The login protection service can create a distributed ledger or other file and/or data structure, which can be associated with the computing device. The login protection service can store the distributed ledger (or a component thereof such as the hash ledger, the passed ledger, or the like) at the server computer or at a data location accessible by the server computer. In some embodiments, the passed ledger can be stored at the computing device, in a distributed network, and/or at a third party device. A block created for (e.g., mined from) the distributed ledger can include an address of the distributed ledger or a component thereof and one or more smart contracts around various conditions, with the last bit of the block corresponding to a status of the smart contract (a zero if the condition is not met and a one if the condition is met).

Because the smart contracts can be coded into the distributed ledger, it can be appreciated that the conditions cannot easily be changed and that a condition being met will result in an automatic update to the value of the status identifier. In various embodiments, the server computer can determine the address of the distributed ledger, where the address can identify a location at which the distributed ledger is stored, a location of the distributed ledger, and a block identifier which can be set to a value of zero or one, and/or an address or location of the block. The server computer can provide an address identifier to the computing device for use in creating logins, with the address optionally pointing directly to the block. It should be understood that this example is illustrative, and therefore should not be construed as being limiting in any way.

The computing device can connect to a third party device at some time to access or request access to a resource such as a web page, application, or the like. At this time, or at other times, the computing device can create a login associated with the resource. The login can include the address (identified by the address identifier) and a password, which can be created by the computing device. According to various embodiments of the concepts and technologies disclosed herein, the computing device can also be given the opportunity to opt-in to login protection, and if opted-in the computing device can be required to create a reset password as part of the login creation process. The third party device can store the login (including the address and the password) at a first data storage location (e.g., the data repository) and the reset password at a second data storage location (e.g., the secure data repository).

The third party device can be configured to validate any attempt by the computing device to access the resource. According to various embodiments, the third party device can be configured to block or deny access to the resource if the credentials provided by the computing device do not match the login, while correct credentials may result in additional validation. It should be understood that this example is illustrative, and therefore should not be construed as being limiting in any way. To perform the additional validation, the third party device can be configured (e.g., via execution of the login protection module) to generate a query and to send the query to the server computer. The query can request a value for the block identifier associated with the distributed ledger that is identified by the address. It should be understood that this example is illustrative, and therefore should not be construed as being limiting in any way.

The server computer, e.g., via execution of the login protection service, can return the identified value to the third party device. In some embodiments, the value of the block identifier can be set to zero by default, and changed to a value of one if a lock trigger is identified by the login protection service (e.g., if a condition set by the smart contracts changes from false to true, or the like). Thus, the login protection module can be configured to deny access to the resource by the computing device if the value is one, even if correct credentials (that match the login) are provided by the computing device. If the value is equal to one, and therefore the login protection module determines that the login associated with the computing device is to be protected or locked, the third party device can modify the login to replace the password with the reset password associated with the computing device, and can send an alert to the computing device indicating that the password has been updated to the reset password.

The computing device can use the address and reset password to log in to access the resource, though in various embodiments of the concepts and technologies disclosed herein the login protection module or other entities can require the computing device to create a new password for the login and/or a new reset password. Upon creating a new password and a new reset password, the computing device and/or the third party device can be configured to inform the server computer, and the block identifier associated with the distributed ledger can be set back to zero, in some embodiments (e.g., by the login protection service updating the trigger condition to reset the condition to reflect that the login is no longer compromised). It should be understood that this example is illustrative, and therefore should not be construed as being limiting in any way.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Referring now to FIG. 1, aspects of an operating environment 100 for various embodiments of the concepts and technologies disclosed herein for providing and using a user login protection service will be described, according to an illustrative embodiment. The operating environment 100 shown in FIG. 1 includes a computing device 102. The computing device 102 can operate in communication with and/or as part of a communications network ("network") 104, though this is not necessarily the case. Additionally, according to various embodiments of the concepts and technologies disclosed herein, the computing device 102 can correspond to one or more devices used by and/or associated with a user.

According to various embodiments, the functionality of the computing device 102 may be provided by one or more desktop computers, mobile telephones, smartphones, tablet computers, laptop computers, vehicle computing systems, other computing systems, and the like. It should be understood that the functionality of the computing device 102 may be provided by a single device, by two or more similar devices, and/or by two or more dissimilar devices. For purposes of describing the concepts and technologies disclosed herein, the computing device 102 is described herein as a smartphone, tablet, personal computer, or other device with which a user may access a website, login to an online resource, and/or interact with various entities to provide login protection as illustrated and described herein. It should be understood that this embodiment is illustrative, and should not be construed as being limiting in any way.

The computing device 102 can execute an operating system 106 and one or more application programs such as, for example, a login protection application 108 and other applications such as a web browser, a mobile application ("mobile app"), and/or the like. In some embodiments of the concepts and technologies disclosed herein, the login protection application 108 is not required to provide the functionality illustrated and described herein and another program such as a web browser can provide the functionality illustrated and described herein and/or access the functionality, which can be provided by a web site or service. As such, it should be understood that the described example embodiment is illustrative, and therefore should not be construed as being limiting in any way. The operating system 106 can include a computer program that can control the operation of the computing device 102. The login protection application 108 can include an executable program that can be configured to execute on top of the operating system 106 to provide or access various functions as illustrated and described herein for providing and using a user login protection service.

According to various embodiments of the concepts and technologies disclosed herein, the computing device 102 can include one or more application programs such as a standalone web browser or a browser integrated into the login protection application. Regardless of how the application programs are configured, the computing device 102 can be configured to obtain a web page, a file, an application, or other online and/or electronic resource (hereinafter referred to as a "resource 110"), which can be hosted and/or executed by a web server, application server, or other device (hereinafter referred to as a "third party device") 112. According to various embodiments of the concepts and technologies disclosed herein, the resource 110 can be located behind a login wall or other authentication requirement. It should be understood that this example is illustrative, and therefore should not be construed as being limiting in any way.

According to some example embodiments of the concepts and technologies disclosed herein, the third party device 112 can correspond to a web server and the resource 110 can correspond to a web page or web application. According to various embodiments of the concepts and technologies disclosed herein, the computing device 102 can request, for example using a web browser, the resource 110 by way of a request 114 (e.g., a hypertext transfer protocol ("HTTP") request, a service call, an application call, or the like). According to various embodiments of the concepts and technologies disclosed herein, the computing device 102 can communicate with the third party device 112 via a first communication channel. It should be understood that this example is illustrative, and therefore should not be construed as being limiting in any way.

The login protection application 108 can be configured to provide various functions for protecting a user login, as will be illustrated and described in more detail herein. The functionality of the login protection application 108 will be described in more detail after additional elements of the operating environment 100 have been introduced.

According to various embodiments of the concepts and technologies disclosed herein, the third party device 112 can execute a login protection module 116. The login protection module 116, can communicate with one or more other devices and/or entities to provide user login protection services. According to various embodiments of the concepts and technologies disclosed herein, the third party device 112 can, via interactions with the computing device 102, create and store one or more logins 118. According to various embodiments of the concepts and technologies disclosed herein, each of the logins 118 can include login name and a password. According to various embodiments of the concepts and technologies disclosed herein, the login name of one or more of the logins 118 can include an address. As will be explained in more detail herein, the address used for the login 118 can identify a location of a file such as a blockchain, a distributed ledger, or the like. According to various embodiments of the concepts and technologies disclosed herein, the login protection module 116 of the third party device 112 can be configured to call or query the file located at the address during a login process, as will be explained in more detail below. These and other functions of the login protection module 116 will be explained in more detail herein after introducing other elements of the operating environment 100.

According to various embodiments of the concepts and technologies disclosed herein, the logins 118 can be stored in a data repository 120 or other data storage device and/or resource. It should be understood that the logins 118 can be stored locally at the third party device 112 in some embodiments (e.g., in a memory, data storage device, or the like). As such, it should be understood that the illustrated embodiment is illustrative and should not be construed as being limiting in any way.

According to various embodiments of the concepts and technologies disclosed herein, the login protection module 116 can be configured to obtain and/or store one or more reset passwords 122 for a user (e.g., associated with a login 118). For example, the login protection module 116 can be configured to request and/or obtain a reset password 122 for the user (of the computing device 102) during creation or change of the login 118 for the user, in some embodiments, or obtained at other times. Reset passwords 122 can be used by the login protection module 116 to protect a user login such as the login 118, as will be explained hereinbelow.

According to various embodiments, the reset password 122 can be stored by the third party device 112 (e.g., via execution of the login protection module 116) in a local or remote data storage resource, device, or other entity. In various embodiments of the concepts and technologies disclosed herein, the reset passwords 122 can be stored in a secure data storage device, location, or resource (hereinafter referred to as the "secure repository") 124. According to various embodiments of the concepts and technologies disclosed herein, the secure repository 124 can be accessible only by the third party device 112 (e.g., the secure repository 124 may have no network connections other than a direct connection with the third party device 112 and therefore may be inaccessible via the network 104 in some embodiments). It should be understood that this example is illustrative, and therefore should not be construed as being limiting in any way.

According to various embodiments of the concepts and technologies disclosed herein, the secure repository 124 illustrated and described herein and the data repository 120 can be provided by two different devices for purposes of protecting the contents of the secure repository 124. In one embodiment, the data repository 120 can be provided by a data storage device of the third party device 112 and the secure repository 124 can be provided by a secure data storage device that is in communication with or accessible by the third party device 112 (e.g., via a bus or secure connection). In another embodiment, the data repository 120 can be provided by a data storage device in communication with the third party device 112 and the secure repository 124 can be provided by a secure data storage device located at the third party device 112 (e.g., a secure memory). In yet other embodiments, as shown in FIG. 1, the data repository 120 can be provided by a first data storage device that can be in communication with or accessible to the third party device 112 and the secure repository 124 can be provided by a secure data storage device that can be in communication with or accessible to the third party device 112. It should be understood that these examples are illustrative, and therefore should not be construed as being limiting in any way.

According to various embodiments, the login protection module 116 can communicate with a login protection service 126 to provide the functionality illustrated and described herein for protecting user logins such as the logins 118. According to various embodiments of the concepts and technologies disclosed herein, the third party device 112 can communicate with the server computer 128 via a second communication channel. As shown in FIG. 1, the login protection service 126 can be executed and/or hosted by a computing device such as the server computer 128. It should be understood that this example is illustrative, and therefore should not be construed as being limiting in any way. The functionality of the login protection service 126 and the login protection module 116 for protecting user logins such as the login 118 will be illustrated and described in more detail herein after other elements of the operating environment 100 have been introduced.

According to various embodiments of the concepts and technologies disclosed herein, the login protection service 126 can create a blockchain or other files such as a distributed ledger 130. The distributed ledger 130 is one contemplated embodiment and therefore should not be construed as being limiting in any way. According to various embodiments of the concepts and technologies disclosed herein, the distributed ledger 130 can be stored at or by the server computer 128 and can be located at an address. The address, in some example embodiments, can indicate the location of the server computer 128 (e.g., a virtual machine in a data center, or the like), and a location of the distributed ledger 130 in that location (e.g., a location in memory of the server computer 128 and/or a location on a network).

When a user opts-in to use the login protection service 126, a block can be mined by the user (e.g., via the login protection application 108 and/or the login protection service 126), and the block can be created and appended to the distributed ledger 130. According to various embodiments, the block can be added with a block identifier that can correspond to a condition for one or more smart contracts. The smart contracts can be created at the creation time of the block and can define a status based on a trigger, with the status returning a condition of zero or one. This status can have the value zero when a login 118 associated with the distributed ledger 130 is uncompromised, and a value of one when the login 118 associated with the distributed ledger 130 has been compromised. Because other values can be used, and because the values can vary for the conditions identified, it should be understood that this example is illustrative, and therefore should not be construed as being limiting in any way.

Furthermore, the distributed ledger 130, as can be appreciated, may be configured as an append-only file. Thus, the owner (e.g., a user associated with the computing device 102) may own the distributed ledger 130 and may be the only entity with write and/or append authority on the distributed ledger 130. As such, it can be appreciated that only the owner can mine blocks while third parties (e.g., the third party device 112) can be given authority to read from the distributed ledger 130. It should be understood that this example is illustrative, and therefore should not be construed as being limiting in any way.

According to various embodiments of the concepts and technologies disclosed herein, the server computer 128 can be configured (e.g., via execution of the login protection service 126) to communicate with the computing device 102. According to various embodiments of the concepts and technologies disclosed herein, the server computer 128 can communicate with the computing device 102 via a third communication channel. Because the third party device 112 can communicate with the server computer 128 to perform the operations illustrated and described herein as occurring between the computing device 102 and the server computer 128, it should be understood that this example is illustrative of some embodiments, and therefore should not be construed as being limiting in any way.

According to various embodiments of the concepts and technologies disclosed herein, the login protection module 116 can be configured to communicate with the login protection service 126. The computing device 102 (e.g., via a choice of a user or other entity associated with the computing device 102) can be configured (e.g., via the login protection application 108, a web browser, or other functionality) to opt-in to use the login protection service 126. According to various embodiments, the computing device 102 can provide an indication of opt-in ("opt-in indication") 132 to the login protection service 126 to begin using the functionality of the login protection service 126. Because the computing device 102 may use the functionality of the login protection service 126 without providing the opt-in indication 132 to the server computer 128 (e.g., an opt-in decision built into the operating system 106, through installation of the login protection application 108, by requesting an option for a reset password 122 when creating the login 118 with the third party device 112, or the like), it should be understood that this example is illustrative, and therefore should not be construed as being limiting in any way.

According to various embodiments, the computing device 102, after opting-in for the login protection service 126, can communicate with the server computer 128, e.g., via a web page, portal, application programming interface ("API"), and/or the like, to obtain one or more address identifier 134. The address identifier 134 can include data such as a text string that can identify the address of the distributed ledger 130 and therefore can identify, in the illustrated embodiment, the server computer 128 and a location in a memory (or on another resource such as a virtual machine) where the distributed ledger 130 is located at the server computer 128. Thus, it can be appreciated that navigating to the address identified by the address identifier 134 can result in navigation to the distributed ledger 130. It should be understood that this example is illustrative, and therefore should not be construed as being limiting in any way.

According to various embodiments, the computing device 102 can also be configured to generate, at various times, one or more lock triggers 136. The lock triggers 136 can correspond to conditions that, if detected by the login protection service 126 (directly or via input from other devices or entities), can cause the login protection service 126 to lock one, some, or all logins 118 associated with the computing device 102. In various embodiments, the lock triggers 136 can correspond to conditions that can be created as smart contracts around conditions defined by the user, where the result of the smart contracts can include a string, the address identified by the address identifier 134, and a block identifier that corresponds to the status (e.g., a zero or a one). It should be understood that this example is illustrative, and therefore should not be construed as being limiting in any way.

In various embodiments, the computing device 102 can provide, in or with the lock trigger 136, one or more address identifiers 134, and the login protection service 126 can be configured to lock one, some, or all logins 118 associated with the address identified by the address identifier 134 provided in or with the lock trigger 136. It should be understood that this example is illustrative, and therefore should not be construed as being limiting in any way.

The login protection module 116 of the third party device 112 can be configured to communicate with the login protection service 126 each time an entity attempts to log in to obtain the resource 110 to validate the login. In particular, the computing device 102 can connect to the third party device 112 via the first communication channel and request the resource 110 (e.g., via the request 114). The third party device 112 can be configured to challenge the computing device 102 for credentials (e.g., a login 118), and the computing device 102 can be configured to provide the credentials via a portal, API, or the like. Upon receiving the credentials and/or data that specifies the credentials (e.g., data identifying an address and password) from the computing device 102, the login protection module 116 can be invoked to validate the attempted access. It should be understood that this example is illustrative, and therefore should not be construed as being limiting in any way.

The login protection module 116 can first compare the credentials to the login 118 associated with the computing device 102 to validate the request. If the credentials do not match the login 118, then access to the resource 110 can be blocked and/or additional authentication operations can be performed. If the credentials do match the login 118, then the login protection module 116 can be configured to further validate the attempted access. According to various embodiments of the concepts and technologies disclosed herein, the login protection module 116 can generate a query or call ("query") 138 and send the query 138 to the server computer 128 via the second communication channel. The query 138 can be used to access the distributed ledger 130 located at the address identified by the credentials and/or login 118 associated with the computing device 102 and/or to obtain a particular value 140 associated with the distributed ledger 130. In various embodiments of the concepts and technologies disclosed herein, the login protection service 126 can be configured to obtain the block identifier associated with the distributed ledger 130 when the query 138 is received and to provide the value 140 to the device that submitted the query 138. It should be understood that this example is illustrative, and therefore should not be construed as being limiting in any way.

It can be appreciated that the address identified by the credentials and/or login 118 associated with the computing device 102 can be the same address identified by the address identifier 134 and the computing device 102 can be configured to use the address as a login name or login identifier when creating the login 118 illustrated and described herein. Thus, the value 140 can correspond to the block identifier associated with the distributed ledger 130. It should be understood that this example is illustrative, and therefore should not be construed as being limiting in any way. According to various embodiments of the concepts and technologies disclosed herein, the value 140 provided by the server computer 128 to the third party device 112 via the second communication channel can be a value of zero or one, or can be a string that ends with a bit that corresponds to the block identifier, i.e., a zero or a one. It should be understood that this example is illustrative, and therefore should not be construed as being limiting in any way.

In some embodiments, the login protection module 116 can be configured to validate the login attempt if the value 140 is zero, and the block identifier associated with the distributed ledger 130 may be initially assigned a value of zero and updated, if needed, to a value of one to indicate that the login 118 should be protected. Thus, if the value 140 is zero the login protection module 116 can allow the login of the computing device 102 and allow the computing device 102 to access the resource 110; while if the value 140 is one the login protection module 116 can block or deny the login of the computing device 102 and block or deny the computing device 102 access to the resource 110. It should be understood that this example is illustrative, and therefore should not be construed as being limiting in any way.

According to various embodiments of the concepts and technologies disclosed herein, the login protection service 126 can be configured to change the value of the block identifier associated with the distributed ledger 130 at various times. In particular, the login protection service 126 can be configured to change the value of the block identifier associated with the distributed ledger 130 if a lock trigger 136 is received from the computing device 102, upon detecting a trigger event, and/or at other times. Because the block identifier can correspond to a condition or status associated with a smart contract, as explained above, it can be appreciated that the value associated with the block identifier can be changed automatically when the condition is detected. Because this smart contract can be built into a block of the distributed ledger 130, it can be appreciated that this smart contract cannot easily be changed, and as such when the trigger condition occurs the login 118 can effectively be locked or protected. It should be understood that this example is illustrative, and therefore should not be construed as being limiting in any way.

In a case in which the server computer 128 determines that the value 140 of the block identifier is to be (or has been) changed from zero to one, the login protection service 126 can detect an update to the value 140 of the block identifier from zero to one and future queries 138 or calls to the distributed ledger 130 can be responded to with the value 140 of one. Also, the login protection service 126 can be configured to push one or more commands 142 out to one or more third party devices 112 when a change to the value 140 of the block identifier is detected. The command 142 can include computer-executable instructions or other data that can advise the login protection module 116 about the lock trigger 136, about the locking of the login 118, and/or command the login protection module 116 to lock the login 118 associated with the computing device 102.

According to various embodiments, the login protection module 116 can be configured to lock the login 118 (that is associated with the computing device 102 and the distributed ledger 130) and/or take other actions to protect the login 118 associated with the computing device 102 and the distributed ledger 130. According to various embodiments of the concepts and technologies disclosed herein, the locking of the login 118 and/or other actions to protect the login 118 associated with the computing device 102 and the distributed ledger 130 can include blocking access to the resource 110 and altering the login 118. According to various embodiments of the concepts and technologies disclosed herein, the login protection module 116 can modify the login 118 (that is being protected) by substituting the reset password 122 for the previously used password included in the login 118. It should be understood that this example is illustrative, and therefore should not be construed as being limiting in any way.

The login protection module 116 can be configured to inform the computing device 102 (which may be requesting the resource 110 as noted above) that the login 118 has been locked or protected. In various embodiments, the login protection module 116 can send an alert 144 to the computing device 102. The alert 144 can include data that can inform the computing device 102 that the login 118 has been locked or is being protected and that the password of the login 118 has been substituted with the reset password 122. It should be noted that the alert 144 sent in various embodiments of the concepts and technologies disclosed herein does not include the reset password 122.

According to various embodiments of the concepts and technologies disclosed herein the user or other entity associated with the computing device 102 is required or assumed to know the reset password 122. Thus, if the user or other entity associated with the computing device 102 receives the alert 144, the user or other entity can login to the third party device 112 using the address associated with the login 118 and the reset password 122 to access the resource 110. Upon logging into the third party device 112, the user or other entity associated with the computing device 102 can be required to create a new password for the login 118 and a new reset password 122. It should be understood that this example is illustrative, and therefore should not be construed as being limiting in any way.

In practice, computing device 102 can opt-in to use the functionality of the login protection service 126. The login protection service 126 can create a distributed ledger 130 or other file and/or data structure, which can be associated with the computing device 102. The login protection service 126 can store the distributed ledger 130 (or a component thereof such as the hash ledger, the passed ledger, or the like) at the server computer 128 or at a data location accessible by the server computer 128. In some embodiments, the passed ledger can be stored at the computing device 102, in a distributed network (e.g., a cloud network), and/or at a third party device 112. A block created for (e.g., mined from) the distributed ledger 130 can include an address of the distributed ledger 130 or a component thereof and one or more smart contracts around various conditions, with the last bit of the block corresponding to a status of the smart contract (a zero if the condition is not met and a one if the condition is met).

Because the smart contracts can be coded into the distributed ledger 130, it can be appreciated that the conditions cannot easily be changed and that a condition being met will result in an automatic update to the value of the status identifier. In various embodiments, the server computer 128 can determine the address of the distributed ledger 130, where the address can identify a location at which the distributed ledger 130 is stored, a location of the distributed ledger 130, and a block identifier which can be set to a value of zero or one, and/or an address or location of the block. The server computer 128 can provide an address identifier 134 to the computing device 102 for use in creating logins 118, with the address optionally pointing directly to the block. It should be understood that this example is illustrative, and therefore should not be construed as being limiting in any way.

The computing device 102 can connect to a third party device 112 at some time to access or request access to a resource 110 such as a web page, an application, a file, or the like. At this time, or at other times, the computing device 102 can create a login 118 associated with the resource 110. The login 118 can include the address (identified by the address identifier 134) and a password, which can be created by the computing device 102. According to various embodiments of the concepts and technologies disclosed herein, the computing device 102 also be given the opportunity to opt-in to login protection, and if opted-in the computing device 102 can be required to create a reset password 122 as part of the login creation process. The third party device 112 can store the login 118 (including the address and the password) at a first data storage location (e.g., the data repository 120) and the reset password 122 at a second data storage location (e.g., the secure repository 124).

The third party device 112 can be configured to validate any attempt by the computing device 102 to access the resource 110. According to various embodiments, the third party device 112 can be configured to block or deny access to the resource 110 if the credentials provided by the computing device 102 do not match the login 118, while correct credentials may result in additional validation. It should be understood that this example is illustrative, and therefore should not be construed as being limiting in any way. To perform the additional validation, the third party device 112 can be configured (e.g., via execution of the login protection module 116) to generate a query 138 and to send the query 138 to the server computer 128. The query 138 can request a value 140 for the block identifier associated with the distributed ledger 130 that is identified by the address. It should be understood that this example is illustrative, and therefore should not be construed as being limiting in any way.

The server computer 128, e.g., via execution of the login protection service 126, can return the identified value 140 to the third party device 112. In some embodiments, the value 140 of the block identifier can be set to zero by default, and changed to a value of one if a lock trigger is identified by the login protection service 126 (e.g., if a condition set by the smart contracts changes from false to true, or the like). Thus, the login protection module 116 can be configured to deny access to the resource 110 by the computing device 102 if the value 140 is one, even if correct credentials (that match the login 118) are provided by the computing device 102. If the value 140 is equal to one, and therefore the login protection module 116 determines that the login 118 associated with the computing device 102 is to be protected or locked, the third party device 112 can modify the login 118 to replace the password with the reset password 122 associated with the computing device 102, and can send an alert 144 to the computing device 102 indicating that the password has been updated to the reset password 122.

The computing device 102 can use the address and reset password 122 to log in to access the resource 110, though in various embodiments of the concepts and technologies disclosed herein the login protection module 116 or other entities can require the computing device 102 to create a new password for the login 118 and/or a new reset password 122. Upon creating a new password and a new reset password 122, the computing device 102 and/or the third party device 112 can be configured to inform the server computer 128, and the block identifier associated with the distributed ledger 130 can be set back to zero, in some embodiments (e.g., by the login protection service 126 updating the trigger condition to reset the condition to reflect that the login 118 is no longer compromised). It should be understood that this example is illustrative, and therefore should not be construed as being limiting in any way.

According to various embodiments of the concepts and technologies disclosed herein, the login protection service 126 can be configured to monitor various conditions and/or networks, and/or to receive updates from various network monitoring services. The login protection service 126 can monitor the network 104 and/or receive updates relating to the network 104. The login protection service 126 also can subscribe to one or more dark web monitoring services to receive updates regarding login leaks, or the like. Still further, the login protection service 126 can subscribe to updates relating to fraudulent activity (e.g., with credit reporting agencies, banks, and the like).

Based on these and/or other monitoring and/or monitoring updates, the login protection service 126 can detect a leak of a login, unauthorized access to personal information associated with the computing device 102, and/or other events that may be defined as trigger events for the smart contracts illustrated and described herein. In some embodiments, a smart contract can be defined for an explicit request to protect logins 118, whereby an explicit request to protect logins 118 can be created using the computing device 102 and/or other devices can result in satisfaction of a trigger condition defined by a smart contract. Because additional and/or alternative trigger conditions can be defined, it should be understood that these examples are illustrative, and therefore should not be construed as being limiting in any way.

It can be appreciated that in various embodiments of the concepts and technologies disclosed herein, the distributed ledger 130 illustrated and described herein can be replaced with other types of data structures. Furthermore, in embodiments of the concepts and technologies disclosed herein using a distributed ledger 130, it can be appreciated that the passed ledger can be stored at various locations. In some embodiments, for example, the passed ledger associated with the distributed ledger 130 can be stored at the computing device 102, and the computing device 102 can be configured (e.g., via execution of the login protection application 108) to mine blocks from the passed ledger and to provide the blocks to an entity such as the server computer 128 for hashing and appending to the hash ledger. In some other embodiments, the passed ledger can be stored by the third party device 112 and new blocks can be mined during login creation. In some other embodiments, the passed ledger can be stored at the server computer 128 and blocks can be mined by the server computer 128 and appended to the hash ledger of the distributed ledger 130 at the server computer 128. In yet other embodiments, the distributed ledger 130 can be stored in a cloud computing architecture and therefore can be accessible by the server computer 128 in various manners. It can be appreciated that all such variations are intended to be included in the embodiments of the concepts and technologies illustrated and described herein.

FIG. 1 illustrates one computing device 102, one network 104, one third party device 112, and one server computer 128. It should be understood, however, that various implementations of the operating environment 100 can include one or more than one computing device 102; zero, one, or more than one network 104; one or more than one third party device 112; and/or zero, one, or more than one server computer 128. As such, the illustrated embodiment should be understood as being illustrative, and should not be construed as being limiting in any way.

Figure 2:
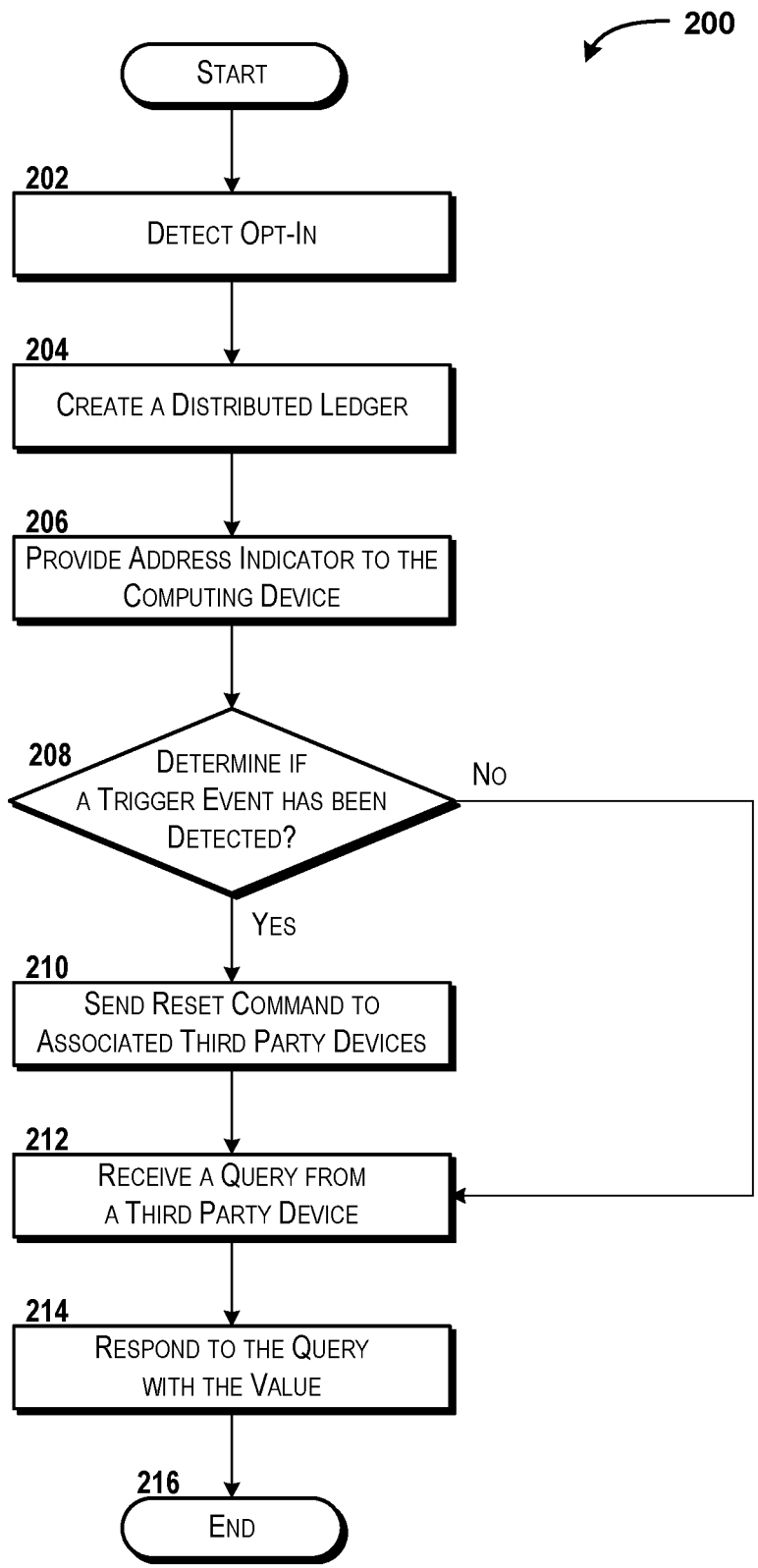
FIG. 2 is a flow diagram showing aspects of a method for providing and using a user login protection service, according to an illustrative embodiment of the concepts and technologies described herein.

Turning now to FIG. 2, aspects of a method 200 for providing and using a user login protection service will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as the third party device 112 and/or the server computer 128, to perform one or more operations and/or causing the processor to direct other components of the computing system or device to perform one or more of the operations.

For purposes of illustrating and describing the concepts of the present disclosure, the method 200 is described herein as being performed by the server computer 128 via execution of one or more software modules such as, for example, the login protection service 126. It should be understood that additional and/or alternative devices and/or network nodes can provide the functionality described herein via execution of one or more modules, applications, and/or other software including, but not limited to, the login protection service 126. Thus, the illustrated embodiments are illustrative, and should not be viewed as being limiting in any way.

The method 200 begins at operation 202. At operation 202, the server computer 128 can detect an opt-in from a computing device 102. For example, the server computer 128 can receive an opt-in indication 132 or other communication that indicates that the user or other entity associated with the computing device 102 has opted-in to using the login protection service 126. The opt-in indication 132 detected in operation 202 can correspond to a user of the computing device 102 opting-in to use the login protection service 126 via a web portal, API, or the like, with the server computer 128, in some embodiments. In some other embodiments, the user may be asked to opt-in for the user login protection during creation of a login 118 with the third party device 112, and the detected opt-in therefore may correspond to detecting an opt-in at the third party device 112. Because the opting-in illustrated and described herein can be detected in additional and/or alternative manners, it should be understood that these examples are illustrative, and therefore should not be construed as being limiting in any way.

From operation 202, the method 200 can proceed to operation 204. At operation 204, the server computer 128 can create a distributed ledger 130 for the user and/or the computing device 102. As explained herein, the distributed ledger 130 can be stored by the server computer 128. The distributed ledger 130 can be stored at an address, as noted herein, with the address identifying a device that stores the distributed ledger 130 and a location, in the device or a local network, where the distributed ledger 130 is stored. In the example illustrated in FIG. 1, the address can identify the server computer 128 and a memory location associated with the server computer 128. It should be understood that this example is illustrative, and therefore should not be construed as being limiting in any way.

According to various embodiments of the concepts and technologies disclosed herein, the distributed ledger 130 created by the server computer 128 in operation 204 can include a block for the address and a block identifier. According to various embodiments of the concepts and technologies disclosed herein, the block identifier can correspond to a state or status associated with one or more smart contracts associated with the distributed ledger 130 and can have a binary value 140 of zero or one based on a condition or trigger associated with the smart contracts (e.g., if the condition defined by a smart contract is not met, the value 140 can be zero, if the condition defined by the smart contract is met, the value 140 can be one, etc.). It can be appreciated that the value 140 of the block identifier can be automatically updated when the condition or trigger associated with the smart contract is detected and that as part of the distributed ledger 130 the smart contract and/or the value 140 associated therewith cannot easily be modified without detection. It should be understood that this example is illustrative, and therefore should not be construed as being limiting in any way.

According to various embodiments, the block identifier can be used to indicate if a login 118 associated with a user of the login protection service 126 has been locked or is to be protected. Namely, if any of the trigger conditions set by way of the one or more smart contracts associated with the distributed ledger 130 are met, the value 140 of the block identifier can automatically change to one, and that value 140 can be used to indicate that the login 118 has been compromised and therefore should be locked or protected. According to various embodiments of the concepts and technologies disclosed herein, the block identifier can have an initial value 140 of zero, which can indicate that the conditions associated with the smart contracts have not been met, thereby indicating that the login 118 has not been compromised and therefore does not need to be locked or blocked.

Similarly, the value 140 of the block identifier can be changed to a value of one if the login protection service 126 detects a trigger condition is met, and this value 140 can indicate that the login 118 is to be protected. It should be understood that the value 140 of the block identifier can be set based on other values (i.e., other than ones and zeroes) if desired, and that the values are examples that can be used. Zeros and ones are preferred in some embodiments as corresponding to false and true results for the conditions defined by the smart contracts. As such, these values are example embodiments and should not be construed as being limiting in any way.

From operation 204, the method 200 can proceed to operation 206. At operation 206, the server computer 128 can provide an address identifier 134 (e.g., that identifies the address of the distributed ledger 130 created in operation 204) to the computing device 102. It can be appreciated with reference to FIG. 1 that the address can be used by the computing device 102 to create one or more logins 118 at one or more third party devices 112 that are configured to provide login protection (e.g., by including a login protection module 116). Thus, it can be appreciated that the functionality illustrated and described herein can be used to protect one or more logins 118 at one or more third party devices 112 and to protect and/or change one or more compromised logins 118 simultaneously at various third party devices 112 when a trigger condition is detected. It should be understood that this example is illustrative, and therefore should not be construed as being limiting in any way.

From operation 206, the method 200 can proceed to operation 208. At operation 208, the server computer 128 can determine if a trigger event has been detected. Although not shown separately in FIG. 2, it can be appreciated that the server computer 128 can collect data periodically and/or continuously, the data relating to the one or more trigger events defined by the one or more smart contracts associated with the distributed ledger 130. In some embodiments, the server computer 128 can subscribe to updates or releases of data relating to the smart contracts, for example. Thus, operation 208 can correspond to the server computer 128 monitoring the value of the results of the one or more smart contracts to determine if any trigger condition is met, with this check occurring at various intervals (e.g., every second, every minute, every hour, every day, or the like) to detect any compromise of any login 118.

It also can be understood that a lock trigger 136 can be received from the computing device 102 or other device at some time, and that the functionality illustrated and described herein for protecting logins 118 can be explicitly requested by the computing device 102 or other entity if desired. In some other embodiments, an explicit request to protect logins 118 can be defined as a smart contract for a block of the distributed ledger 130 and receipt of the lock trigger 136 can correspond to satisfaction of a trigger event defined by a smart contract in some embodiments. It should be understood that this example is illustrative, and therefore should not be construed as being limiting in any way.

If the server computer 128 determines, in operation 208, that a trigger event has been detected (e.g., that a value 140 of the block identifier has changed to one, that a trigger event has been detected, or the like), the method 200 can proceed to operation 210. At operation 210, the server computer 128 can send a command 142 to one or more third party device 112 that use the address of the distributed ledger 130 for logins 118. As noted above, the command 142 can inform one or more third party device 112 that the login 118 associated with the distributed ledger 130 is to be protected.

As noted herein, the protection of the login 118 can include the one or more third party device 112 blocking authentication of the computing device 102 using the current password of the login 118 (which seemingly has been compromised), changing the current password of the login 118 to the reset password 122, and informing the computing device 102 that the change to the login has been made and requiring new authentication, in various embodiments. Because additional operations may be performed and/or required in response to the command 142, it should be understood that these examples are illustrative, and therefore should not be construed as being limiting in any way.

From operation 210, the method 200 can proceed to operation 212. The method 200 also can proceed to operation 212 from operation 208 if the server computer 128 determines, in operation 208, that a trigger event (e.g., that a value 140 of the block identifier has changed to one, that a trigger event has been detected, or the like) has not been detected. At operation 212, the server computer 128 can receive a query 138 from a third party device 112. The query 138 can request a value 140 associated with the block identifier associated with the distributed ledger 130 (e.g., a value 140 of a last bit associated with a block of the distributed ledger 130 associated with the computing device 102), with that value 140 corresponding to the status or state associated with one or more smart contracts based on one or more trigger conditions.

Thus, the value 140 requested in operation 212 can indicate, to the recipient, if the login 118 has been compromised or not. Again, as noted herein, the value 140 can be updated automatically via occurrence of a trigger condition. In various embodiments, it should be understood that operation 208 may be omitted and that the server computer 128 may not detect occurrence of a trigger condition until the value 140 is determined in operation 212. As such, it should be understood that the illustrated embodiment is illustrative and should not be construed as being limiting in any way.

From operation 212, the method 200 can proceed to operation 214. At operation 214, the server computer 128 can respond to the query 138 with the value 140 requested in operation 212. Thus, the server computer 128 can send, in operation 214, a value 140 of one or a value 140 of zero in various embodiments. It should be understood that operations 210-212 can occur before operation 208 in various embodiments of the FIG. 2 and/or that operation 208 can be omitted in some embodiments as noted above. As such, it should be understood that the illustrated embodiment is illustrative and should not be construed as being limiting in any way. It can be appreciated that the third party device 112 can use the value 140 provided in operation 214 to validate a login attempt and therefore may be used to allow or block access to the resource 110. It should be understood that this example is illustrative, and therefore should not be construed as being limiting in any way.

From operation 214, the method 200 can proceed to operation 216. The method 200 can end at operation 216.

Figure 3:
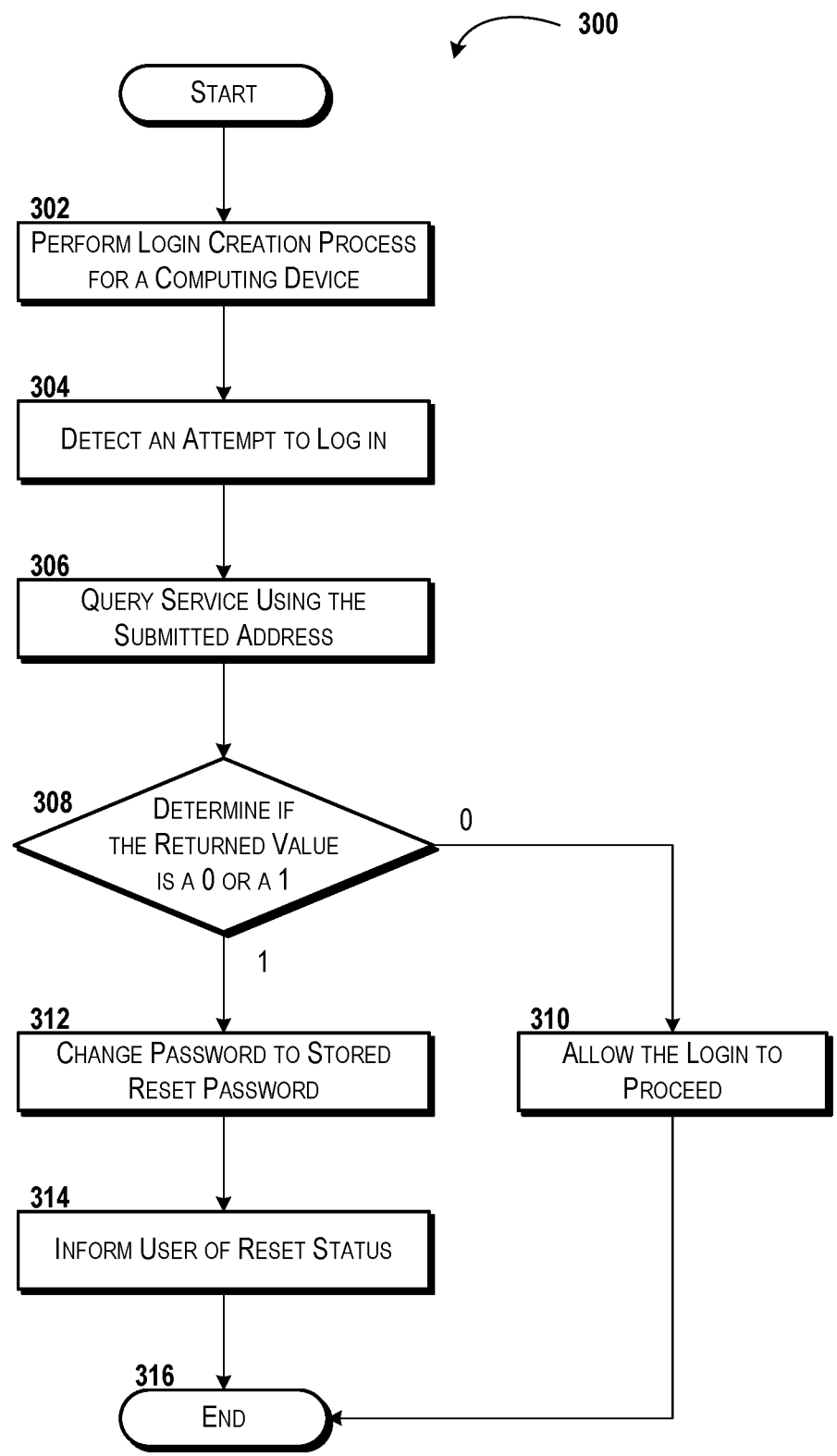
FIG. 3 is a flow diagram showing aspects of a method for managing user logins by communicating with a user login protection service, according to an illustrative embodiment of the concepts and technologies described herein.

Turning now to FIG. 3, aspects of a method 300 for managing user logins by communicating with a user login protection service will be described in detail, according to an illustrative embodiment. For purposes of illustrating and describing the concepts of the present disclosure, the method 300 is described herein as being performed by the third party device 112 via execution of one or more software modules such as, for example, the login protection module 116. It should be understood that additional and/or alternative devices and/or network nodes can provide the functionality described herein via execution of one or more modules, applications, and/or other software including, but not limited to, the login protection module 116. Thus, the illustrated embodiments are illustrative, and should not be viewed as being limiting in any way.

The method 300 begins at operation 302. At operation 302, the third party device 112 can perform a login creation process for the computing device 102. During the login creation process, the computing device 102 can be presented with functionality for creating a login name and a password. In various embodiments of the concepts and technologies disclosed herein, the computing device 102 also can be provided an option to opt-in to use login protection (or the computing device 102 can opt-in in other manners as illustrated and described herein). It should be noted that FIG. 3 is illustrated and described based on the user opting-in (or the third party device 112 requiring) login protection. The third party device 112 can store the login 118 (which includes the address and a password) and a reset password 122 that can be associated with the login 118 but stored separately. According to various embodiments of the concepts and technologies disclosed herein, the reset password 122 can be associated with the address as well, though this is not necessarily the case. It can be appreciated that the third party device 112 can associate the reset password 122 with the computing device 102 in a variety of manners and that all such variations are included in various embodiments of the concepts and technologies disclosed herein.

From operation 302, the method 300 can proceed to operation 304. At operation 304, the third party device 112 can detect an attempted login. Operation 304 can include the third party device 112 detecting a request 114 for the resource 110 and receipt of login credentials. According to various embodiments of the concepts and technologies disclosed herein, the login credentials identify the address and the password of the login 118. Of course, if the login credentials do not match the login 118 the access to the resource 110 can be denied and the method 300 can end. Thus, FIG. 3 is illustrated and described assuming that the login credentials and/or login information received in conjunction with the attempted login in operation 304 match the login 118.

From operation 304, the method 300 can proceed to operation 306. At operation 306, the third party device 112 can send a query 138 to a login protection service 126 using the address submitted as part of the attempted login in operation 304. It can be appreciated that the third party device 112 can be configured to access the distributed ledger 130 identified by the address, in some embodiments, and check the value 140 of the last bit of the distributed ledger 130 or other file or value 140 associated with the address. In the illustrated embodiment, the third party device 112 submits a query 138 on the login protection service 126. It should be understood that this example is illustrative, and therefore should not be construed as being limiting in any way. As noted above, the server computer 128 can respond to the query 138 with a value 140 that is provided to the third party device 112.

From operation 306, the method 300 can proceed to operation 308. At operation 308, the third party device 112 can determine if the returned value 140 from the login protection service 126 is a zero or a one. As explained herein, a value 140 of zero can indicate that none of one or more trigger conditions defined by smart contracts associated with the distributed ledger 130 have not been satisfied; and a value 140 of one can indicate that one or more trigger conditions defined by smart contracts associated with the distributed ledger 130 have been satisfied.

If the third party device 112 determines, in operation 308, that the returned value 140 from the login protection service 126 is a zero, the method 300 can proceed to operation 310. At operation 310, the third party device 112 can allow the login to proceed. If the third party device 112 determines, in operation 308, that the value 140 from the login protection service 126 is a one, the method 300 can proceed to operation 312. At operation 312, the third party device 112 can change a password associated with the login 118 to the stored reset password 122.

From operation 312, the method 300 can proceed to operation 314. At operation 314, the third party device 112 can inform the user (e.g., the computing device 102) of the change to the password associated with the login 118 and require another attempt to log in to determine if the computing device 102 knows the reset password 122. In various embodiments, operation 308 can correspond to the third party device 112 providing the alert 144 to the computing device 102. The alert 144 can inform the computing device 102 that another attempt to log in should be made using the reset password 122 (that the computing device 102 is required to know in accordance with various embodiments of the concepts and technologies disclosed herein). In a new attempt to log in (not shown in FIG. 3), the computing device 102 may be required to create a new password for the login 118 and to create a new reset password 122 for one or more third party device 112. It should be understood that this example is illustrative, and therefore should not be construed as being limiting in any way.

According to various embodiments of the concepts and technologies disclosed herein, the third party device 112 may be configured to receive a command 142 to protect the login 118 instead of querying the login protection service 126 for a value 140 as illustrated and described herein. Thus, it can be appreciated that operations 308-310 can be replaced, in some embodiments, with an operation for the third party device 112 receiving a command 142 to protect the login 118, after which the method 300 can flow to operations 312-314 as illustrated and described herein. It should be understood that this example is illustrative, and therefore should not be construed as being limiting in any way.

From operation 314, the method 300 can proceed to operation 316. The method 300 also can proceed to operation 316 from operation 310. The method 300 can end at operation 316.

Figure 4:
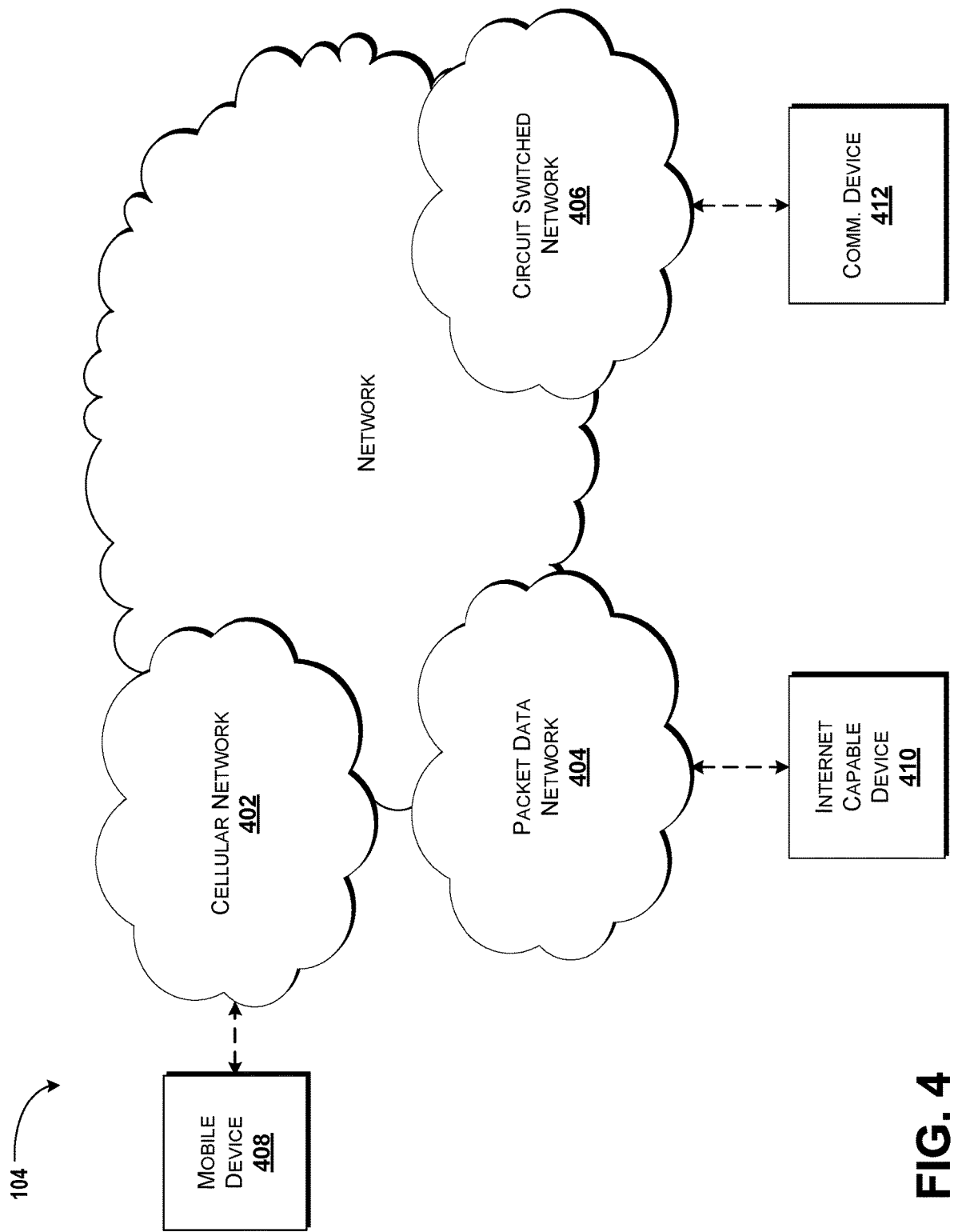
FIG. 4 schematically illustrates a network, according to an illustrative embodiment of the concepts and technologies described herein.

Turning now to FIG. 4, additional details of the network 104 are illustrated, according to an illustrative embodiment. The network 104 includes a cellular network 402, a packet data network 404, for example, the Internet, and a circuit switched network 406, for example, a publicly switched telephone network ("PSTN"). The cellular network 402 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 402 also includes radios and nodes for receiving and transmitting voice, data, and combinations thereof to and from radio transceivers, networks, the packet data network 404, and the circuit switched network 406.

A mobile communications device 408, such as, for example, a cellular telephone, a user equipment, a mobile terminal, a PDA, a laptop computer, a handheld computer, and combinations thereof, can be operatively connected to the cellular network 402. The cellular network 402 can be configured as a 2G GSM network and can provide data communications via GPRS and/or EDGE. Additionally, or alternatively, the cellular network 402 can be configured as a 3G UMTS network and can provide data communications via the HSPA protocol family, for example, HSDPA, EUL (also referred to as HSUPA), and HSPA+. The cellular network 402 also is compatible with 4G mobile communications standards, 5G mobile communications standards, other mobile communications standards, and evolved and future mobile communications standards.

The packet data network 404 includes various devices, for example, servers, computers, databases, and other devices in communication with one another, as is generally known. The packet data network 404 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 404 includes or is in communication with the Internet. The circuit switched network 406 includes various hardware and software for providing circuit switched communications. The circuit switched network 406 may include, or may be, what is often referred to as a plain old telephone system (POTS). The functionality of a circuit switched network 406 or other circuit-switched network are generally known and will not be described herein in detail.

The illustrated cellular network 402 is shown in communication with the packet data network 404 and a circuit switched network 406, though it should be appreciated that this is not necessarily the case. One or more Internet-capable devices 410, for example, a PC, a laptop, a portable device, or another suitable device, can communicate with one or more cellular networks 402, and devices connected thereto, through the packet data network 404. It also should be appreciated that the Internet-capable device 410 can communicate with the packet data network 404 through the circuit switched network 406, the cellular network 402, and/or via other networks (not illustrated).

As illustrated, a communications device 412, for example, a telephone, facsimile machine, modem, computer, or the like, can be in communication with the circuit switched network 406, and therethrough to the packet data network 404 and/or the cellular network 402. It should be appreciated that the communications device 412 can be an Internet-capable device, and can be substantially similar to the Internet-capable device 410. In the specification, the network 104 is used to refer broadly to any combination of the networks 402, 404, 406. It should be appreciated that substantially all of the functionality described with reference to the network 104 can be performed by the cellular network 402, the packet data network 404, and/or the circuit switched network 406, alone or in combination with other networks, network elements, and the like.

Figure 5:
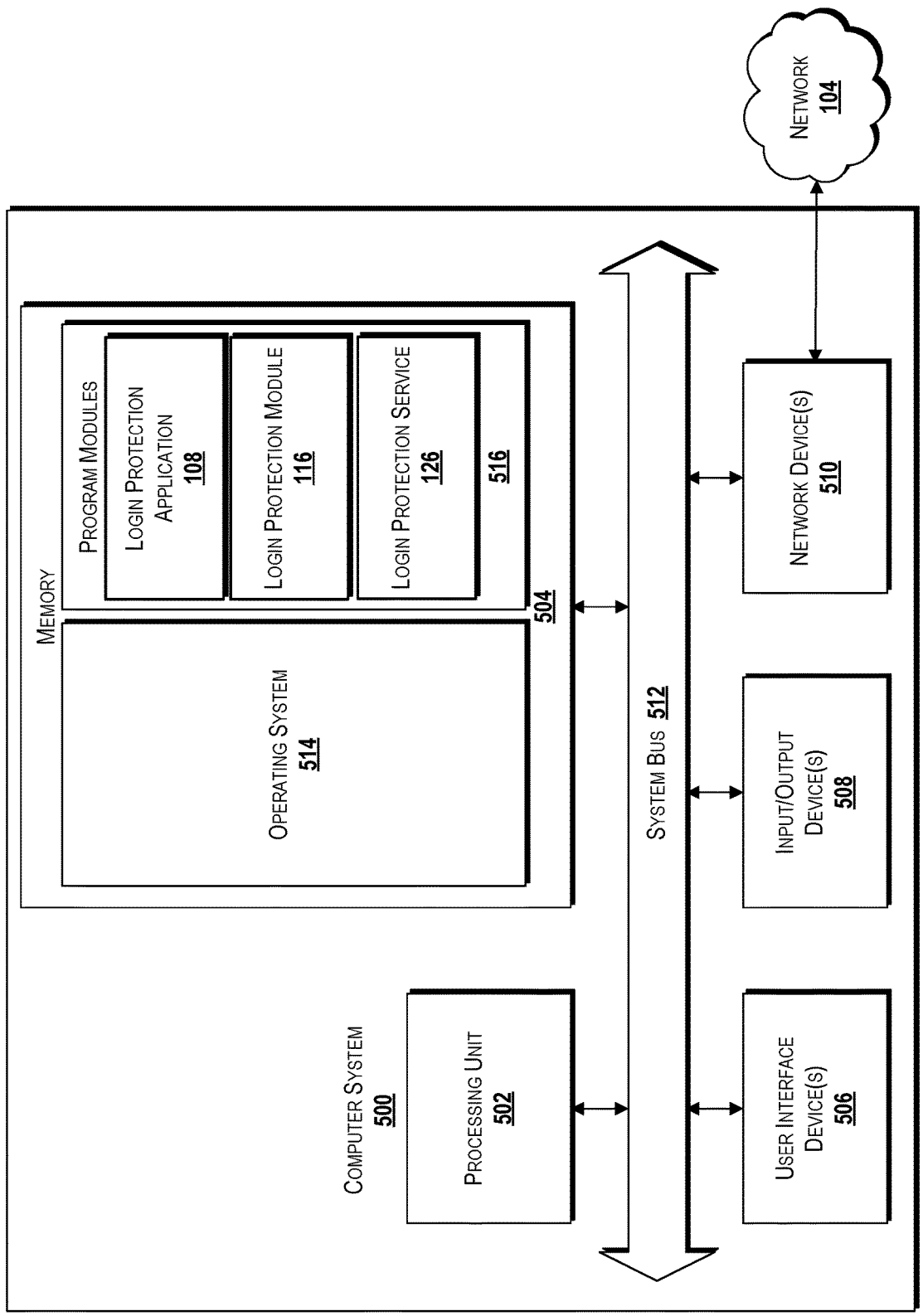
FIG. 5 is a block diagram illustrating an example computer system configured to provide and use a user login protection service, according to some illustrative embodiments of the concepts and technologies described herein.

FIG. 5 is a block diagram illustrating a computer system 500 configured to provide the functionality described herein for providing and using a user login protection service, in accordance with various embodiments of the concepts and technologies disclosed herein. The computer system 500 includes a processing unit 502, a memory 504, one or more user interface devices 506, one or more input/output ("I/O") devices 508, and one or more network devices 510, each of which is operatively connected to a system bus 512. The bus 512 enables bi-directional communication between the processing unit 502, the memory 504, the user interface devices 506, the I/O devices 508, and the network devices 510.

The processing unit 502 may be a standard central processor that performs arithmetic and logical operations, a more specific purpose programmable logic controller ("PLC"), a programmable gate array, or other type of processor known to those skilled in the art and suitable for controlling the operation of the server computer. As used herein, the word "processor" and/or the phrase "processing unit" when used with regard to any architecture or system can include multiple processors or processing units distributed across and/or operating in parallel in a single machine or in multiple machines. Furthermore, processors and/or processing units can be used to support virtual processing environments. Processors and processing units also can include state machines, application-specific integrated circuits ("ASICs"), combinations thereof, or the like. Because processors and/or processing units are generally known, the processors and processing units disclosed herein will not be described in further detail herein.

The memory 504 communicates with the processing unit 502 via the system bus 512. In some embodiments, the memory 504 is operatively connected to a memory controller (not shown) that enables communication with the processing unit 502 via the system bus 512. The memory 504 includes an operating system 514 and one or more program modules 516. The operating system 514 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 516 may include various software and/or program modules described herein. In some embodiments, for example, the program modules 516 include a web browser, the login protection application 108, the login protection module 116, and/or the login protection service 126. These and/or other programs can be embodied in computer-readable media containing instructions that, when executed by the processing unit 502, perform one or more of the methods 200 and 300 described in detail above with respect to FIGS. 2 and 3 and/or other functionality as illustrated and described herein. It can be appreciated that, at least by virtue of the instructions embodying the methods 200 and 300, and/or other functionality illustrated and described herein being stored in the memory 504 and/or accessed and/or executed by the processing unit 502, the computer system 500 is a special-purpose computing system that can facilitate providing the functionality illustrated and described herein. According to embodiments, the program modules 516 may be embodied in hardware, software, firmware, or any combination thereof. Although not shown in FIG. 5, it should be understood that the memory 504 also can be configured to store the resource 110, the request 114, the logins 118 (including addresses and passwords), the reset passwords 122, the distributed ledger 130, the opt-in indication 132, the address identifier 134, the lock trigger 136, the query 138, the value 140, the command 142, the alert 144, and/or other data, if desired.

By way of example, and not limitation, computer-readable media may include any available computer storage media or communication media that can be accessed by the computer system 500. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes only non-transitory embodiments of computer readable media as illustrated and described herein. Thus, computer storage media can include volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 500. In the claims, the phrase "computer storage medium" and variations thereof does not include waves or signals per se and/or communication media.

The user interface devices 506 may include one or more devices with which a user accesses the computer system 500. The user interface devices 506 may include, but are not limited to, computers, servers, personal digital assistants, cellular phones, or any suitable computing devices. The I/O devices 508 enable a user to interface with the program modules 516. In one embodiment, the I/O devices 508 are operatively connected to an I/O controller (not shown) that enables communication with the processing unit 502 via the system bus 512. The I/O devices 508 may include one or more input devices, such as, but not limited to, a keyboard, a mouse, or an electronic stylus. Further, the I/O devices 508 may include one or more output devices, such as, but not limited to, a display screen or a printer.

The network devices 510 enable the computer system 500 to communicate with other networks or remote systems via a network, such as the network 104. Examples of the network devices 510 include, but are not limited to, a modem, a radio frequency ("RF") or infrared ("IR") transceiver, a telephonic interface, a bridge, a router, or a network card. The network 104 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 104 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 6:
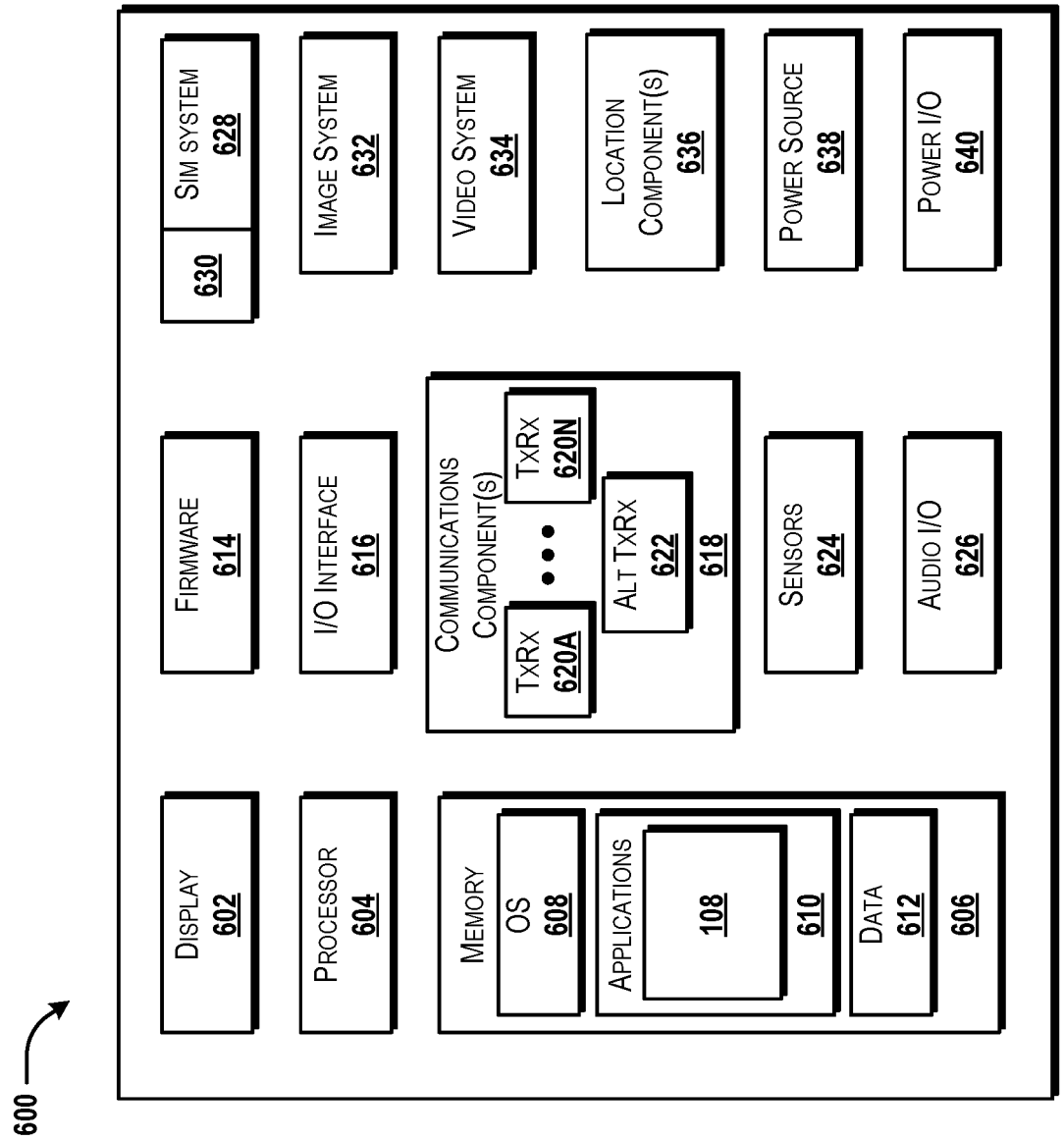
FIG. 6 is a block diagram illustrating an example mobile device, according to some illustrative embodiments of the concepts and technologies described herein.

Turning now to FIG. 6, an illustrative mobile device 600 and components thereof will be described. In some embodiments, the computing device 102, the third party device 112, and/or the server computer 128 described above with reference to FIGS. 1-3 can be configured as and/or can have an architecture similar or identical to the mobile device 600 described herein in FIG. 6. It should be understood, however, that the computing device 102, the third party device 112, and/or the server computer 128, may or may not include the functionality described herein with reference to FIG. 6. While connections are not shown between the various components illustrated in FIG. 6, it should be understood that some, none, or all of the components illustrated in FIG. 6 can be configured to interact with one another to carry out various device functions. In some embodiments, the components are arranged so as to communicate via one or more busses (not shown). Thus, it should be understood that FIG. 6 and the following description are intended to provide a general understanding of a suitable environment in which various aspects of embodiments can be implemented, and should not be construed as being limiting in any way.

As illustrated in FIG. 6, the mobile device 600 can include a display 602 for displaying data. According to various embodiments, the display 602 can be configured to display various graphical user interface ("GUI") elements such as, for example, login windows, text, images, video, virtual keypads and/or keyboards, messaging data, notification messages, metadata, internet content, device status, time, date, calendar data, device preferences, map and location data, combinations thereof, and/or the like. The mobile device 600 also can include a processor 604 and a memory or other data storage device ("memory") 606. The processor 604 can be configured to process data and/or can execute computer-executable instructions stored in the memory 606. The computer-executable instructions executed by the processor 604 can include, for example, an operating system 608, one or more applications 610 such as the a web browser, the login protection application 108, the login protection module 116, the login protection service 126, the lock trigger 136, the query 138, the command 142, the alert 144, other computer-executable instructions stored in a memory 606, or the like. In some embodiments, the applications 610 also can include a UI application (not illustrated in FIG. 6).

The UI application can interface with the operating system 608, such as the operating system 106 shown in FIG. 1, to facilitate user interaction with functionality and/or data stored at the mobile device 600 and/or stored elsewhere. In some embodiments, the operating system 608 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 604 to aid a user in entering content, creating and/or entering logins 118 (e.g., including addresses and passwords), opting-in to use the login protection service 126, creating reset passwords 122, configuring settings, manipulating address book content and/or settings, multimode interaction, interacting with other applications 610, and otherwise facilitating user interaction with the operating system 608, the applications 610, and/or other types or instances of data 612 that can be stored at the mobile device 600. The data 612 can include, for example, a web browser, the login protection application 108, the login protection module 116, and/or the login protection service 126, and/or other applications or program modules. According to various embodiments, the data 612 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 610, the data 612, and/or portions thereof can be stored in the memory 606 and/or in a firmware 614, and can be executed by the processor 604.

It can be appreciated that, at least by virtue of storage of the instructions corresponding to the applications 610 and/or other instructions embodying other functionality illustrated and described herein in the memory 606, and/or by virtue of the instructions corresponding to the applications 610 and/or other instructions embodying other functionality illustrated and described herein being accessed and/or executed by the processor 604, the mobile device 600 is a special-purpose mobile device that can facilitate providing the functionality illustrated and described herein. The firmware 614 also can store code for execution during device power up and power down operations. It can be appreciated that the firmware 614 can be stored in a volatile or non-volatile data storage device including, but not limited to, the memory 606 and/or a portion thereof.

The mobile device 600 also can include an input/output ("I/O") interface 616. The I/O interface 616 can be configured to support the input/output of data such as location information, the resource 110, the request 114, the logins 118 (including addresses and passwords), the reset passwords 122, the distributed ledger 130, the opt-in indication 132, the address identifier 134, the lock trigger 136, the query 138, the value 140, the command 142, the alert 144, user information, organization information, presence status information, user IDs, passwords, and application initiation (startup) requests. In some embodiments, the I/O interface 616 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45 or RJ48) port, a telephone (RJ11 or the like) port, a proprietary port, combinations thereof, or the like. In some embodiments, the mobile device 600 can be configured to synchronize with another device to transfer content to and/or from the mobile device 600. In some embodiments, the mobile device 600 can be configured to receive updates to one or more of the applications 610 via the I/O interface 616, though this is not necessarily the case. In some embodiments, the I/O interface 616 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 616 may be used for communications between the mobile device 600 and a network device or local device.

The mobile device 600 also can include a communications component 618. The communications component 618 can be configured to interface with the processor 604 to facilitate wired and/or wireless communications with one or more networks such as the network 104 described herein. In some embodiments, other networks include networks that utilize non-cellular wireless technologies such as WI-FI or WIMAX. In some embodiments, the communications component 618 includes a multimode communications subsystem for facilitating communications via the cellular network and one or more other networks.

The communications component 618, in some embodiments, includes one or more transceivers. The one or more transceivers, if included, can be configured to communicate over the same and/or different wireless technology standards with respect to one another. For example, in some embodiments one or more of the transceivers of the communications component 618 may be configured to communicate using GSM, CDMAONE, CDMA2000, LTE, and various other 2G, 2.5G, 3G, 4G, 5G, and greater generation technology standards. Moreover, the communications component 618 may facilitate communications over various channel access methods (which may or may not be used by the aforementioned standards) including, but not limited to, TDMA, FDMA, W-CDMA, OFDM, SDMA, and the like.

In addition, the communications component 618 may facilitate data communications using GPRS, EDGE, the HSPA protocol family including HSDPA, EUL or otherwise termed HSDPA, HSPA+, and various other current and future wireless data access standards. In the illustrated embodiment, the communications component 618 can include a first transceiver ("TxRx") 620A that can operate in a first communications mode (e.g., GSM). The communications component 618 also can include an $N^{th}$ transceiver ("TxRx") 620N that can operate in a second communications mode relative to the first transceiver 620A (e.g., UMTS). While two transceivers 620A-N (hereinafter collectively and/or generically referred to as "transceivers 620") are shown in FIG. 6, it should be appreciated that less than two, two, and/or more than two transceivers 620 can be included in the communications component 618.

The communications component 618 also can include an alternative transceiver ("Alt TxRx") 622 for supporting other types and/or standards of communications. According to various contemplated embodiments, the alternative transceiver 622 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 618 also can facilitate reception from terrestrial radio networks, digital satellite radio networks, internet-based radio service networks, combinations thereof, and the like. The communications component 618 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 600 also can include one or more sensors 624. The sensors 624 can include temperature sensors, light sensors, air quality sensors, movement sensors, orientation sensors, noise sensors, proximity sensors, or the like. As such, it should be understood that the sensors 624 can include, but are not limited to, accelerometers, magnetometers, gyroscopes, infrared sensors, noise sensors, microphones, combinations thereof, or the like. Additionally, audio capabilities for the mobile device 600 may be provided by an audio I/O component 626. The audio I/O component 626 of the mobile device 600 can include one or more speakers for the output of audio signals, one or more microphones for the collection and/or input of audio signals, and/or other audio input and/or output devices.

The illustrated mobile device 600 also can include a subscriber identity module ("SIM") system 628. The SIM system 628 can include a universal SIM ("USIM"), a universal integrated circuit card ("UICC") and/or other identity devices. The SIM system 628 can include and/or can be connected to or inserted into an interface such as a slot interface 630. In some embodiments, the slot interface 630 can be configured to accept insertion of other identity cards or modules for accessing various types of networks. Additionally, or alternatively, the slot interface 630 can be configured to accept multiple subscriber identity cards. Because other devices and/or modules for identifying users and/or the mobile device 600 are contemplated, it should be understood that these embodiments are illustrative, and should not be construed as being limiting in any way.

The mobile device 600 also can include an image capture and processing system 632 ("image system"). The image system 632 can be configured to capture or otherwise obtain photos, videos, and/or other visual information. As such, the image system 632 can include cameras, lenses, charge-coupled devices ("CCDs"), combinations thereof, or the like. The mobile device 600 may also include a video system 634. The video system 634 can be configured to capture, process, record, modify, and/or store video content. Photos and videos obtained using the image system 632 and the video system 634, respectively, may be added as message content to an MMS message, email message, and sent to another mobile device. The video and/or photo content also can be shared with other devices via various types of data transfers via wired and/or wireless communication devices as described herein.

The mobile device 600 also can include one or more location components 636. The location components 636 can be configured to send and/or receive signals to determine a geographic location of the mobile device 600. According to various embodiments, the location components 636 can send and/or receive signals from global positioning system ("GPS") devices, assisted-GPS ("A-GPS") devices, WI-FI/WIMAX and/or cellular network triangulation data, combinations thereof, and the like. The location component 636 also can be configured to communicate with the communications component 618 to retrieve triangulation data for determining a location of the mobile device 600. In some embodiments, the location component 636 can interface with cellular network nodes, telephone lines, satellites, location transmitters and/or beacons, wireless network transmitters and receivers, combinations thereof, and the like. In some embodiments, the location component 636 can include and/or can communicate with one or more of the sensors 624 such as a compass, an accelerometer, and/or a gyroscope to determine the orientation of the mobile device 600. Using the location component 636, the mobile device 600 can generate and/or receive data to identify its geographic location, or to transmit data used by other devices to determine the location of the mobile device 600. The location component 636 may include multiple components for determining the location and/or orientation of the mobile device 600.

The illustrated mobile device 600 also can include a power source 638. The power source 638 can include one or more batteries, power supplies, power cells, and/or other power subsystems including alternating current ("AC") and/or direct current ("DC") power devices. The power source 638 also can interface with an external power system or charging equipment via a power I/O component 640. Because the mobile device 600 can include additional and/or alternative components, the above embodiment should be understood as being illustrative of one possible operating environment for various embodiments of the concepts and technologies described herein. The described embodiment of the mobile device 600 is illustrative, and should not be construed as being limiting in any way.

Figure 7:
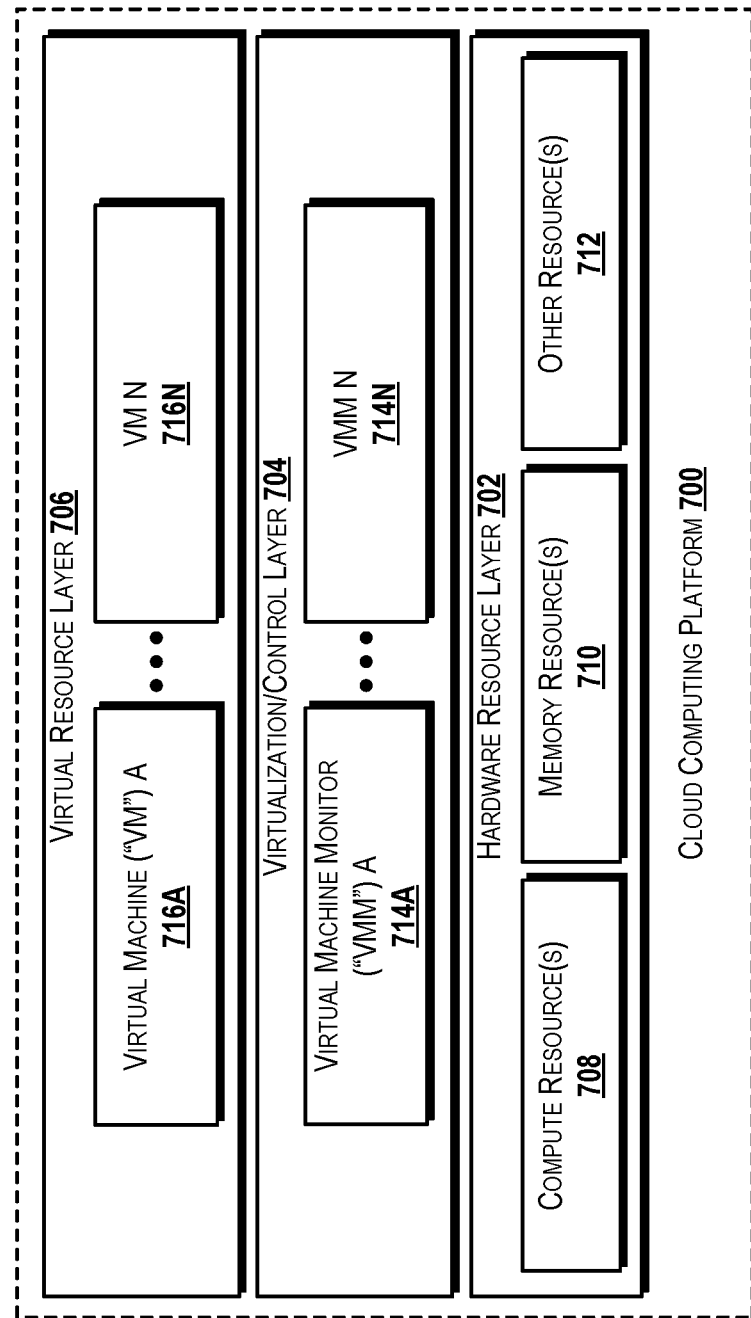
FIG. 7 is a diagram illustrating a computing environment capable of implementing aspects of the concepts and technologies disclosed herein, according to some illustrative embodiments of the concepts and technologies described herein.

FIG. 7 illustrates an illustrative architecture for a cloud computing platform 700 that can be capable of executing the software components described herein for providing and using a user login protection service and/or for interacting with the login protection application 108, the login protection module 116, and/or the login protection service 126. Thus, it can be appreciated that in some embodiments of the concepts and technologies disclosed herein, the cloud computing platform 700 illustrated in FIG. 7 can be used to provide the functionality described herein with respect to the computing device 102, the third party device 112, and/or the server computer 128.

The cloud computing platform 700 thus may be utilized to execute any aspects of the software components presented herein. Thus, according to various embodiments of the concepts and technologies disclosed herein, the web browser, the login protection application 108, the login protection module 116, and/or the login protection service 126 can be implemented, at least in part, on or by elements included in the cloud computing platform 700 illustrated and described herein. Those skilled in the art will appreciate that the illustrated cloud computing platform 700 is a simplification of but only one possible implementation of an illustrative cloud computing platform, and as such, the illustrated cloud computing platform 700 should not be construed as being limiting in any way.

In the illustrated embodiment, the cloud computing platform 700 can include a hardware resource layer 702, a virtualization/control layer 704, and a virtual resource layer 706. These layers and/or other layers can be configured to cooperate with each other and/or other elements of a cloud computing platform 700 to perform operations as will be described in detail herein. While connections are shown between some of the components illustrated in FIG. 7, it should be understood that some, none, or all of the components illustrated in FIG. 7 can be configured to interact with one another to carry out various functions described herein. In some embodiments, the components are arranged so as to communicate via one or more networks such as, for example, the network 104 illustrated and described hereinabove (not shown in FIG. 7). Thus, it should be understood that FIG. 7 and the following description are intended to provide a general understanding of a suitable environment in which various aspects of embodiments can be implemented, and should not be construed as being limiting in any way.

The hardware resource layer 702 can provide hardware resources. In the illustrated embodiment, the hardware resources can include one or more compute resources 708, one or more memory resources 710, and one or more other resources 712. The compute resource(s) 708 can include one or more hardware components that can perform computations to process data, and/or to execute computer-executable instructions of one or more application programs, operating systems, services, and/or other software including, but not limited to, the web browser, the login protection application 108, the login protection module 116, and/or the login protection service 126 illustrated and described herein.

According to various embodiments, the compute resources 708 can include one or more central processing units ("CPUs"). The CPUs can be configured with one or more processing cores. In some embodiments, the compute resources 708 can include one or more graphics processing units ("GPUs"). The GPUs can be configured to accelerate operations performed by one or more CPUs, and/or to perform computations to process data, and/or to execute computer-executable instructions of one or more application programs, operating systems, and/or other software that may or may not include instructions that are specifically graphics computations and/or related to graphics computations. In some embodiments, the compute resources 708 can include one or more discrete GPUs. In some other embodiments, the compute resources 708 can include one or more CPU and/or GPU components that can be configured in accordance with a co-processing CPU/GPU computing model. Thus, it can be appreciated that in some embodiments of the compute resources 708, a sequential part of an application can execute on a CPU and a computationally-intensive part of the application can be accelerated by the GPU. It should be understood that this example is illustrative, and therefore should not be construed as being limiting in any way.

In some embodiments, the compute resources 708 also can include one or more system on a chip ("SoC") components. It should be understood that an SoC component can operate in association with one or more other components as illustrated and described herein, for example, one or more of the memory resources 710 and/or one or more of the other resources 712. In some embodiments in which an SoC component is included, the compute resources 708 can be or can include one or more embodiments of the SNAP-DRAGON brand family of SoCs, available from QUAL-COMM of San Diego, California; one or more embodiment of the TEGRA family of SoCs, available from NVIDIA of Santa Clara, California; one or more embodiment of the HUMMINGBIRD brand family of SoCs, available from SAMSUNG of Seoul, South Korea; one or more embodiment of the Open Multimedia Application Platform ("OMAP") family of SoCs, available from TEXAS INSTRUMENTS of Dallas, Texas; one or more customized versions of any of the above SoCs; and/or one or more other brand and/or one or more proprietary SoCs.

The compute resources 708 can be or can include one or more hardware components arranged in accordance with an ARM architecture, available for license from ARM HOLDINGS of Cambridge, United Kingdom. Alternatively, the compute resources 708 can be or can include one or more hardware components arranged in accordance with an x86 architecture, such as an architecture available from INTEL CORPORATION of Mountain View, California, and others. Those skilled in the art will appreciate the implementation of the compute resources 708 can utilize various computation architectures and/or processing architectures. As such, the various example embodiments of the compute resources 708 as mentioned hereinabove should not be construed as being limiting in any way. Rather, implementations of embodiments of the concepts and technologies disclosed herein can be implemented using compute resources 708 having any of the particular computation architecture and/or combination of computation architectures mentioned herein as well as other architectures.

Although not separately illustrated in FIG. 7, it should be understood that the compute resources 708 illustrated and described herein can host and/or execute various services, applications, portals, and/or other functionality illustrated and described herein. Thus, the compute resources 708 can host and/or can execute the web browser, the login protection application 108, the login protection module 116, and/or the login protection service 126 or other applications or services illustrated and described herein.

The memory resource(s) 710 can include one or more hardware components that can perform or provide storage operations, including temporary and/or permanent storage operations. In some embodiments, the memory resource(s) 710 can include volatile and/or non-volatile memory implemented in any method or technology for storage of information such as computer-readable instructions, data structures, program modules, or other data disclosed herein. Computer storage media is defined hereinabove and therefore should be understood as including, in various embodiments, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium that can be used to store data and that can be accessed by the compute resources 708, subject to the definition of "computer storage media" provided above (e.g., as excluding waves and signals per se and/or communication media as defined in this application).

Although not illustrated in FIG. 7, it should be understood that the memory resources 710 can host or store the various data illustrated and described herein including, but not limited to, the resource 110, the request 114, the logins 118 (including addresses and passwords), the reset passwords 122, the distributed ledger 130, the opt-in indication 132, the address identifier 134, the lock trigger 136, the query 138, the value 140, the command 142, the alert 144, and/or other data, if desired. It should be understood that this example is illustrative, and therefore should not be construed as being limiting in any way.

The other resource(s) 712 can include any other hardware resources that can be utilized by the compute resources(s) 708 and/or the memory resource(s) 710 to perform operations. The other resource(s) 712 can include one or more input and/or output processors (e.g., a network interface controller and/or a wireless radio), one or more modems, one or more codec chipsets, one or more pipeline processors, one or more fast Fourier transform ("FFT") processors, one or more digital signal processors ("DSPs"), one or more speech synthesizers, combinations thereof, or the like.

The hardware resources operating within the hardware resource layer 702 can be virtualized by one or more virtual machine monitors ("VMMs") 714A-714N (also known as "hypervisors;" hereinafter "VMMs 714"). The VMMs 714 can operate within the virtualization/control layer 704 to manage one or more virtual resources that can reside in the virtual resource layer 706. The VMMs 714 can be or can include software, firmware, and/or hardware that alone or in combination with other software, firmware, and/or hardware, can manage one or more virtual resources operating within the virtual resource layer 706.

The virtual resources operating within the virtual resource layer 706 can include abstractions of at least a portion of the compute resources 708, the memory resources 710, the other resources 712, or any combination thereof. These abstractions are referred to herein as virtual machines ("VMs"). In the illustrated embodiment, the virtual resource layer 706 includes VMs 716A-716N (hereinafter "VMs 716").

Based on the foregoing, it should be appreciated that systems and methods for providing and using a user login protection service have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:
1. A system comprising:
a processor; and
a memory that stores computer-executable instructions that, when executed by the processor, cause the processor to perform operations comprising
detecting, during a login creation process, input that indicates that a computing device has opted-in for protection for a login being created,
storing, during the login creation process, the login in a first data storage location, the login comprising an address and a password, wherein the address iden- tifies a location of a distributed ledger associated with the computing device, storing, during the login creation process, a reset password in a second data storage location comprising a secure data storage device, the reset password being associated with the login, in response to detecting an attempt by the computing device to log in to access a resource, obtaining a value associated with the distributed ledger, the value being associated with a trigger condition associated with the login, if a determination is made that the value is zero, allowing the attempt to log in to proceed, and if a determination is made that the value is one, blocking the attempt to log in, modifying the password of the login to be the reset password, and informing the computing device that the password has changed to the reset password.

2. The system of claim 1, wherein the trigger condition comprises a smart contract associated with the distributed ledger, and wherein the value comprises a result of the smart contract.

3. The system of claim 2, wherein the value is zero if the result of the smart contract is false.

4. The system of claim 2, wherein the value is one if the result of the smart contract is true.

5. The system of claim 1, wherein the address identifies a memory location at which the distributed ledger is stored, the distributed ledger comprising a block generated for the computing device and comprising a smart contract that defines the trigger condition for the protection for the login.

6. The system of claim 1, wherein the login is obtained from the computing device via a first communication channel, and wherein the value is obtained via a second communication channel.

7. The system of claim 1, wherein obtaining the value comprises generating a query on the address, sending the query to a login protection service via a second communication channel, and receiving the query from the login protection service via the second communication channel.

8. A method comprising:
   detecting, by a computer comprising a processor and during a login creation process, input that indicates that a computing device has opted-in for protection for a login being created;
   storing, by the processor and during the login creation process, the login in a first data storage location, the login comprising an address and a password, wherein the address identifies a location of a distributed ledger associated with the computing device;
   storing, by the processor and during the login creation process, a reset password in a second data storage location comprising a secure data storage device, the reset password being associated with the login;
   in response to detecting an attempt by the computing device to log in to access a resource, obtaining a value associated with the distributed ledger, the value being associated with a trigger condition associated with the login;
   if a determination is made that the value is zero, allowing, by the processor, the attempt to log in to proceed; and
   if a determination is made that the value is one, blocking, by the processor, the attempt to log in, modifying, by the processor, the password of the login to be the reset password, and informing, by the processor, the computing device that the password has changed to the reset password.

9. The method of claim 8, wherein the trigger condition comprises a smart contract associated with the distributed ledger, and wherein the value comprises a result of the smart contract.

10. The method of claim 9, wherein the value is zero if the result of the smart contract is false, and wherein the value is one if the result of the smart contract is true.

11. The method of claim 8, wherein the address identifies a memory location at which the distributed ledger is stored, the distributed ledger comprising a block generated for the computing device and comprising a smart contract that defines the trigger condition for the protection for the login.

12. The method of claim 8, wherein the login is obtained from the computing device via a first communication channel, and wherein the value is obtained via a second communication channel.

13. The method of claim 8, wherein obtaining the value comprises generating a query on the address, sending the query to a login protection service via a second communication channel, and receiving the query from the login protection service via the second communication channel.

14. A computer storage medium having computer-executable instructions stored thereon that, when executed by a processor, cause the processor to perform operations comprising:
   detecting, during a login creation process, input that indicates that a computing device has opted-in for protection for a login being created;
   storing, during the login creation process, the login in a first data storage location, the login comprising an address and a password, wherein the address identifies a location of a distributed ledger associated with the computing device;
   storing, during the login creation process, a reset password in a second data storage location comprising a secure data storage device, the reset password being associated with the login;
   in response to detecting an attempt by the computing device to log in to access a resource, obtaining a value associated with the distributed ledger, the value being associated with a trigger condition associated with the login;
   if a determination is made that the value is zero, allowing the attempt to log in to proceed; and
   if a determination is made that the value is one, blocking the attempt to log in, modifying the password of the login to be the reset password, and informing the computing device that the password has changed to the reset password.

15. The computer storage medium of claim 14, wherein the trigger condition comprises a smart contract associated with the distributed ledger, and wherein the value comprises a result of the smart contract.

16. The computer storage medium of claim 15, wherein the value is zero if the result of the smart contract is false.

17. The computer storage medium of claim 15, wherein the value is one if the result of the smart contract is true.

18. The computer storage medium of claim 14, wherein the address identifies a memory location at which the distributed ledger is stored, the distributed ledger comprising a block generated for the computing device and comprising a smart contract that defines the trigger condition for the protection for the login.

19. The computer storage medium of claim 14, wherein the login is obtained from the computing device via a first communication channel, and wherein the value is obtained via a second communication channel.

20. The computer storage medium of claim 14, wherein obtaining the value comprises generating a query on the address, sending the query to a login protection service via a second communication channel, and receiving the query from the login protection service via the second communication channel.

\* \* \* \* \*